(12) United States Patent
Gupta et al.

(10) Patent No.: US 12,013,780 B2
(45) Date of Patent: Jun. 18, 2024

(54) MULTI-PARTITION MEMORY SHARING WITH MULTIPLE COMPONENTS

(71) Applicant: Google LLC, Mountain View, CA (US)

(72) Inventors: Suyog Gupta, Sunnyvale, CA (US);
Ravi Narayanaswami, San Jose, CA (US); Uday Kumar Dasari, San Jose, CA (US); Ali Iranli, Cupertino, CA (US); Pavan Thirunagari, Sunnyvale, CA (US); Vinu Vijay Kumar, Belmont, CA (US); Sunitha R. Kosireddy, Saratoga, CA (US)

(73) Assignee: Google LLC, Mountain View, CA (US)

( * ) Notice: Subject to any disclaimer, the term of this patent is extended or adjusted under 35 U.S.C. 154(b) by 240 days.

(21) Appl. No.: 17/425,918

(22) PCT Filed: Aug. 19, 2020

(86) PCT No.: PCT/US2020/047025
§ 371 (c)(1),
(2) Date: Jul. 26, 2021

(87) PCT Pub. No.: WO2022/039736
PCT Pub. Date: Feb. 24, 2022

(65) Prior Publication Data
US 2022/0300421 A1 Sep. 22, 2022

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0631* (2013.01);
(Continued)

(58) Field of Classification Search
CPC ............... G06F 12/084; G06F 12/0848; G06F 2212/502
See application file for complete search history.

(56) References Cited

U.S. PATENT DOCUMENTS 5,537,640 A 7/1996 Pawlowski et al.
2002/0184445 A1* 12/2002 Cherabuddi .......... G06F 12/084
711/130
(Continued)

FOREIGN PATENT DOCUMENTS

EP 3012741 4/2016
TW 201007465 2/2010

OTHER PUBLICATIONS

"Foreign Office Action", TW Application No. 109142172, dated Aug. 23, 2021, 7 pages.
(Continued)

*Primary Examiner* — David Yi
*Assistant Examiner* — Nicholas A. Paperno
(74) *Attorney, Agent, or Firm* — Colby Nipper PLLC

(57) ABSTRACT

Components on an IC chip may operate faster or provide higher performance relative to power consumption if allowed access to sufficient memory resources. If every component is provided its own memory, however, the chip becomes expensive. In described implementations, memory is shared between two or more components. For example, a processing component can include computational circuitry and a memory coupled thereto. A multi-component cache controller is coupled to the memory. Logic circuitry is coupled to the cache controller and the memory. The logic circuitry selectively separates the memory into multiple memory partitions. A first memory partition can be allocated to the computational circuitry and provide storage to the computational circuitry. A second memory partition can be allocated to the cache controller and provide storage to multiple components. The relative capacities of the memory partitions are adjustable to accommodate fluctuating demands without dedicating individual memories to the components.

20 Claims, 14 Drawing Sheets

(52) U.S. Cl.
CPC .......... *G06F 3/0644* (2013.01); *G06F 3/0679* (2013.01); *G06F 2212/60* (2013.01)

(56) References Cited

U.S. PATENT DOCUMENTS

| | | | |
|---|---|---|---|
| 2003/0065886 A1 | 4/2003 | Olarig et al. | |
| 2010/0332761 A1 | 12/2010 | Li | |
| 2014/0052961 A1* | 2/2014 | Vorbach | G06F 9/345 712/33 |
| 2015/0324132 A1* | 11/2015 | Chen | G06F 3/0679 711/159 |
| 2016/0154735 A1* | 6/2016 | Hwang | G06F 12/0895 711/130 |
| 2018/0300208 A1* | 10/2018 | Oruganti | G06F 3/0683 |
| 2019/0384370 A1* | 12/2019 | Kim | G06F 9/3004 |
| 2022/0011954 A1* | 1/2022 | King | G06F 3/0631 |

OTHER PUBLICATIONS

"International Search Report and Written Opinion", Application No. PCT/US2020/047025, dated May 21, 2021, 10 pages.

Fajardo, et al., "Buffer-Integrated-Cache: A Cost-Effective SRAM Architecture for Handheld and Embedded Platforms", Intel Labs, Intel Corp., Seoul National University of Science and Technology, 2011, 6 pages.

"Foreign Office Action", EP Application No. 20765412.0, dated Aug. 10, 2022, 5 pages.

"Foreign Office Action", EP Application No. 20765412.0, dated Mar. 2, 2023, 4 pages.

"International Preliminary Report on Patentability", Application No. PCT/US2020/047025, dated Feb. 16, 2023, 7 pages.

* cited by examiner

MULTI-PARTITION MEMORY SHARING WITH MULTIPLE COMPONENTS

RELATED APPLICATION(S)

This application is a national stage entry of International Application No. PCT/US2020/047025, filed 19 Aug. 2020, the disclosure of which is incorporated herein by reference in its entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Personal electronic devices enable portable video viewing and access to smart digital assistants. Additionally, one versatile electronic device—the smartphone—has practically become a necessity to have within arm's reach.

To provide various features and services, each electronic device includes an integrated circuit (IC), such as a processor or wireless transceiver. The IC provides intelligence to the electronic device to enable different functions. On the one hand, the more integrated circuitry a device has, the more capability the device can have. On the other hand, increasing integrated circuitry increases the costs and size of an electronic device. One approach to balancing capability versus cost and size is to employ a system-on-chip (SoC). The SoC combines different types of circuitry onto a single IC chip to manage cost and size. An SoC, however, has a limited size due to being contained on a single IC chip. An SoC also introduces significant complexity because multiple capabilities are provided in a constrained area. Managing these size and complexity issues is challenging for designers and manufacturers of SoCs and the electronic devices that include such chips.

SUMMARY

Generally, mating a processor to appropriate memory resources improves operation of the processor. A given processor, like an artificial intelligence (AI) accelerator, can execute code with better performance as the capacity of a local memory of the processor increases. For example, for "always-on" automatic speech recognition (ASR), a sufficiently large local random-access memory (RAM) can enable an AI accelerator to perform ASR with lower latency and lower power consumption. A larger local memory for an AI accelerator can also increase performance per watt for certain use cases, like machine learning (ML) processing of high-resolution video frames.

A system-level-cache (SLC) can provide cache services to multiple other components, regardless of whether another component has its own local memory. A larger SLC can also facilitate faster processing and a better power profile for particular use cases. For example, temporal noise reduction (TNR) can be performed more efficiently during ultra-high definition (UHD) video capture if the SLC has enough capacity because the number of accesses to main memory can be reduced. Thus, it is desirable from the perspective of individual processing components and of cache components to increase memory capacity to improve performance and energy efficiency.

If the size of these separate local memories for these processing and cache components is increased across all such components, however, the area occupied by all the individual memories greatly increases. As a result, increasing the memory capacity for each component conflicts with the area constraints of an integrated circuit (IC) chip, especially that of a system-on-chip (SoC) that can contain numerous components. In other words, providing a large local memory for each component on a chip would increase a size of the chip and therefore appreciably increase a cost of the chip. A tension therefore exists between processing capability and efficiency performance, on the one hand, and an ability to provide memory on an IC chip in a cost-effective manner on the other hand.

To alleviate this tension, described implementations share a memory between two or more components. For example, a memory can be shared between a processing component and a caching component, such as a multi-component cache controller. The multi-component cache controller provides cache services to other components in a system, like a different processing component. The shared memory, which can be realized as static RAM (SRAM), can be accessible by the processing component as a local memory and by the multi-component cache controller as a cache memory usable by other system components. To provide cache services, the multi-component cache controller can maintain tag information to monitor what data is cached and to perform cache hit/miss determinations. In this way, a shared memory can service multiple components to reduce a total area of an IC chip that is dedicated to providing memory. This provides cost savings while substantially maintaining the speed and energy-efficiency performance of the multiple components.

In example implementations, a processing component includes an SRAM for local memory storage. This SRAM memory block is hosted within the processing component. If the processing component is realized as an AI accelerator, for instance, the AI accelerator can use SRAM as a scratchpad memory while executing an ML model. The processing component exposes at least one read/write port to the SRAM for access by a multi-component cache controller. The multi-component cache controller uses the SRAM to cache data for its cache clients. To account for fluctuating processing demands, the SRAM can be selectively separated into varyingly sized memory partitions. For example, a first memory partition allocated to the processing component can have a first capacity of 75 percent (75%) of the SRAM while the processing component is performing a relatively demanding operation. Responsive to the operational demands decreasing, the processing component can release at least a portion of the SRAM (e.g., 50% of the SRAM). Consequently, a second capacity of the second memory partition that is allocated to the multi-component cache controller can increase from 25% to 75% if the full 50% of the relinquished memory is transferred. Accordingly, the multi-component cache controller can offer more memory to its cache clients when the processing component is using less of the SRAM.

Aspects described below include an apparatus for memory sharing. The apparatus includes a processing component, a multi-component cache controller, logic circuitry, and multiple components. The processing component includes computational circuitry and a memory coupled to the computational circuitry. The multi-component cache controller is coupled to the memory. The logic circuitry is coupled to the multi-component cache controller and the memory. The logic circuitry is configured to selectively separate the memory into multiple memory partitions, including a first memory partition and a second memory partition. The first memory partition is allocated to the computational circuitry and configured to provide storage to the computational circuitry. The second memory partition is allocated to the multi-component cache controller and configured to provide storage to the multiple components. The apparatus may, for instance, be realized as an integrated circuit, or the apparatus may be another apparatus that includes such an integrated circuit.

Aspects described below include a method for sharing a memory that is performed by an apparatus. The method includes performing, by computational circuitry of a processing component, an operation. The method also includes accessing, by the computational circuitry, a first memory partition of a memory of the processing component to support performance of the operation. The method additionally includes receiving, by a multi-component cache controller, a request to cache data from a component. The method further includes storing, by the multi-component cache controller, the data in a second memory partition of the memory based on the request. The method also includes adjusting a first capacity of the first memory partition and a second capacity of the second memory partition.

Aspects described below include a system for memory sharing that may be realized as at least part of an apparatus or an IC of an apparatus. The system includes means for performing, by computational circuitry of a processing component, an operation. The system also includes means for accessing, by the computational circuitry, a first memory partition of a memory of the processing component to support performance of the operation. The system additionally includes means for receiving, by a multi-component cache controller, a request to cache data from a component. The system further includes means for storing, by the multi-component cache controller, the data in a second memory partition of the memory based on the request. The system also includes means for adjusting a first capacity of the first memory partition and a second capacity of the second memory partition.

BRIEF DESCRIPTION OF THE DRAWINGS

Apparatuses of and techniques for memory sharing are described with reference to the following drawings. The same numbers are used throughout the drawings to reference like features and components:

FIG. 1-1 illustrates an example integrated circuit that includes a memory, a multi-component cache controller, and multiple other components.

FIG. 2-1 illustrates example approaches to flexibly sharing the memory using memory partitions of different capacities.

FIG. 3-1 illustrates an example portion of the segmented architecture of FIG. 3, including a tile and associated channel logic.

FIG. 3-2 illustrates another example segmented architecture for memory sharing in which a processing component includes multiple tiles.

FIG. 4-1 illustrates the architecture of FIG. 4 with an overlay of an example memory partitioning scheme.

FIG. 4-2 illustrates an example approach to controlling the multiple banks and multiple multiplexers of the architecture of FIG. 4 to selectively separate the memory portion into multiple memory partitions.

DETAILED DESCRIPTION

Overview

Figure 1:
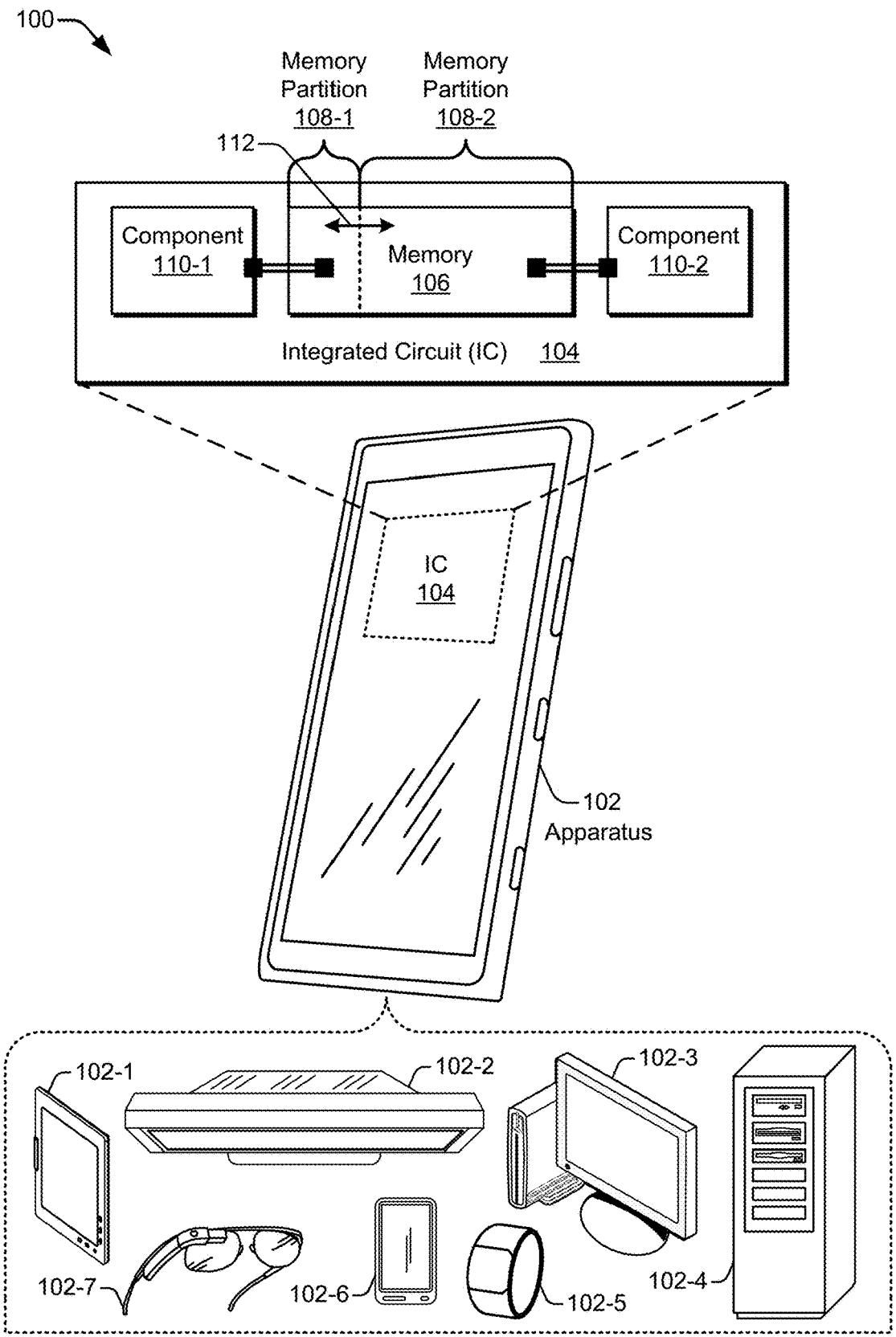
FIG. 1 illustrates an example apparatus with an integrated circuit (IC) that includes multiple components that can share a memory to implement memory sharing as described herein.
Figure 1:
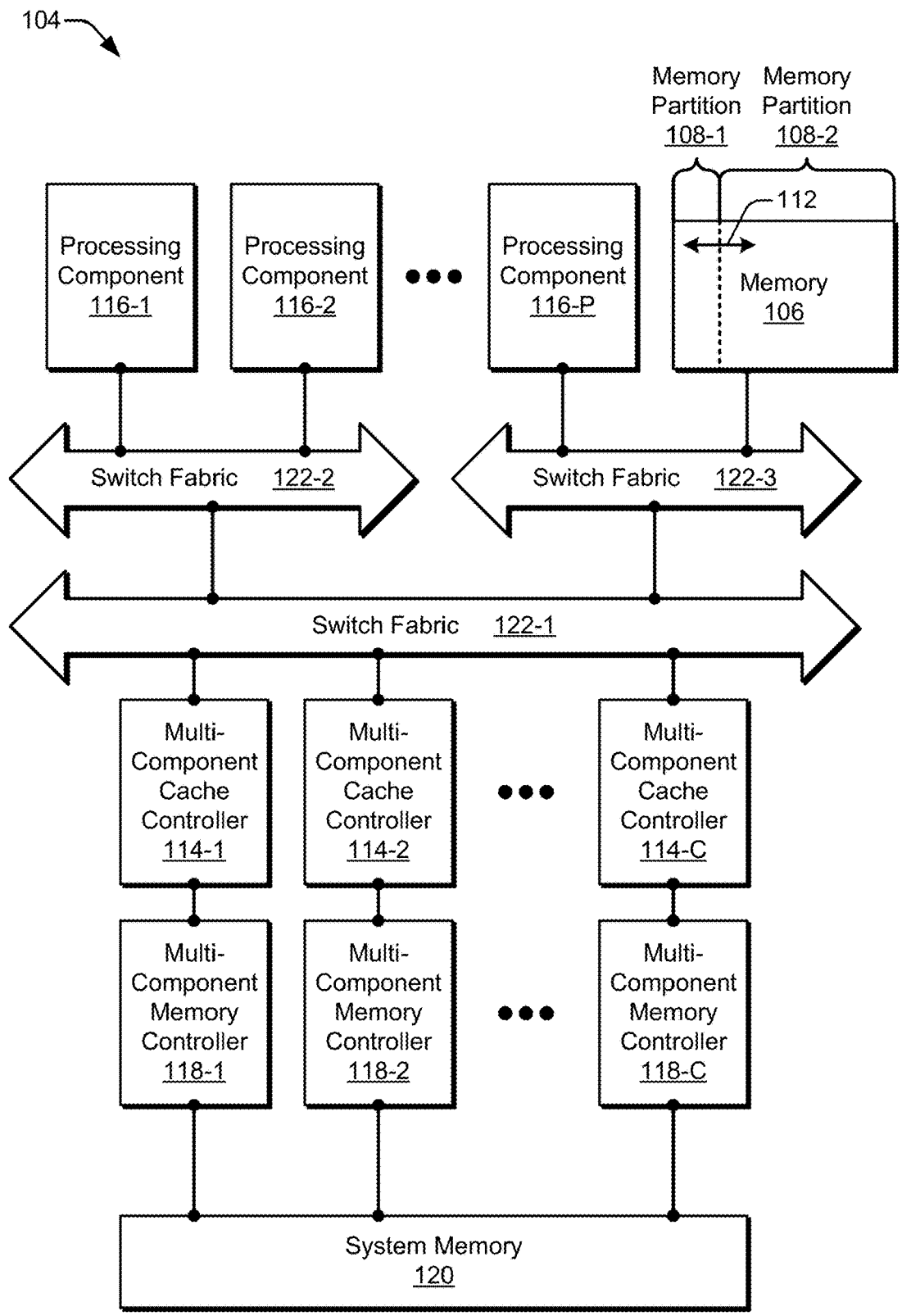

Electronic devices make crucial contributions to modern society, such as those for communication, safety, and manufacturing. Each electronic device relies on an integrated circuit (IC) that has processing capabilities to provide some functionality. The size and cost of an electronic device can be reduced by decreasing the total size or cost of the multiple ICs that are typically employed within the electronic device. One way to decrease the total size and cost of the multiple ICs within an electronic device is to reduce a total quantity of ICs within the device. To do so, an amount of circuitry that is included on each IC of the device can be increased to thereby decrease how many ICs are employed within the device. In an extreme example, most of the circuitry, or at least an appreciable portion of the circuitry, of an electronic device is incorporated onto a single IC to conserve space and lower costs. This is referred to as a system-on-chip (SoC). Many smaller electronic devices, including intelligent assistants and some smartphones, include an SoC.

An SoC may include multiple types of processors, different memories, controllers for various purposes, both analog and digital portions, timing and power management circuitries, and at least one switching fabric to interconnect the various components. Examples of processors include general-purpose processors (e.g., a central processing unit (CPU), graphics processors (e.g., a graphics processing unit (GPU)), communication processors (e.g., a modem), artificial intelligence (AI) processors (e.g., a neural network accelerator), digital signal processors (DSPs), and so forth. Each processor performs computation that uses a memory to store data, such as input, intermediate, and output data. Accordingly, an SoC can include different memories for different components, including various processing components.

In some architectures, an SoC includes a respective dedicated memory for each respective processing component. For example, a GPU can include a memory for graphics data, and an AI processor can include another memory for AI data. At times, such as while performing an intensive graphics-related procedure, a storage capacity of the memory for the GPU may be insufficient to store all the current graphics data. Similarly, the memory for the AI processor may be insufficient at times to store all data being used for a current task, such as speech recognition, that is being accelerated by the AI processor. In these situations, an individual processor may have data with no capacity left in its dedicated memory to store the data, which can be called overflow data. To account for such situations, the SoC can include a system-level cache. The system-level cache is designed to store overflow data originating from multiple components in the system, including different processing components such as the GPU processor or the AI processor.

Even with individual dedicated memories and a joint system-level cache, the SoC may fail to include enough memory to handle complex or data-intensive tasks. This memory scarcity on the SoC or the processing portions thereof results in accesses to a main memory. These accesses reduce processing performance because accessing the main memory is slower than accessing the dedicated memories or the system-level cache memory. Memory scarcity can be addressed by simply adding more memory on the SoC, such as at the individual components or at the system-level cache. In one example approach, a designer of an IC chip can include more capacity at each respective dedicated memory for each individual processing component. Unfortunately, the area on an IC chip is like land in a city—there is a limited amount of territory, and obtaining more territory is expensive. Fabricating a larger IC chip to provide more area for the SoC significantly increases the cost of the IC chip and therefore the cost of the electronic device. This increased area and cost is further multiplied by the number of individual processing components on the SoC that might need more memory.

As an alternative approach, an IC chip designer can include more capacity in the memory of the system-level cache. This enables the added memory capacity to be used by many different components that have overflow data without needing to provide additional capacity at the respective dedicated memory of each individual component. This cache-based approach, however, still involves increasing a size of the system-level cache memory and therefore a cost of the IC chip. Moreover, the added capacity is located at the system-level cache, which may be relatively distant from many of the individual components, including performance-critical processing components. This distance increases access times for the overflow data stored in the system-level cache. Further, the specialized circuitry that is employed to access the system-level cache, such as circuitry for matching a requested memory address to tag information, also increases access times for the overflow data. Thus, although increasing a size of a system-level cache memory can provide additional memory capacity for an SoC, the increased memory size still increases the cost of the SoC. Moreover, memory access times are slower for data stored in the system-level cache memory as compared to those for data stored in a dedicated memory of an individual component.

To address these issues, this document describes implementations that share a memory between two or more components of an integrated circuit, such as an SoC. The sharing can be based on current tasks or current memory utilization. Each individual component can access a part of the shared memory. To enable this sharing, the memory is separated into multiple memory partitions. Each respective memory partition of the multiple memory partitions is allocated to a respective component of multiple components. In some cases, a size or capacity of each memory partition is adjustable based on current operational parameters. For example, at a first time a given component can be associated with a memory partition having 25% of the shared memory, and at a second time the component can be associated with a memory partition having 50% of the shared memory. In this manner, an amount of memory that is allocated to an individual component can be adapted to current processing demands. The adaptability of described implementations can provide increased memory capacity to individual components according to current usage without needing to permanently expand the dedicated memory of each individual component. This flexibility can decrease the size and/or cost of an SoC for a given performance level. Such adaptability can also increase performance relative to power consumption.

In some implementations, a system-level cache is an example of a component that shares a memory with at least one other component. In these implementations, the system-level cache is allocated a memory partition of the memory. The system-level cache can then offer the allocated memory partition as cache memory to other components, such as a modem or a CPU. To provide cache memory services, the system-level cache can include circuitry for storing tag bits and for checking the tags to determine a cache hit or miss. The system can therefore provide a variable-sized cache memory to meet fluctuating demands of multiple components without requiring a large dedicated memory to be available full-time for cache services. Using a shared memory for a system-level cache can therefore reduce memory expenditures and conserve general IC chip resources.

In other implementations, a component includes a memory that is selectively shared with other components. The component can be implemented as a processing component, such as an AI accelerator engine. An individual component can determine how much capacity of the memory will be currently utilized by the individual component and how much is available to be shared. Based on this determination, a memory partition can be allocated to computational circuitry of the individual component. This memory partition can be physically proximate to the computational circuitry. Additionally or alternatively, the memory partition can be optimized for use with the particular type of processing operations performed by that processing component, such as those relating to graphics or neural network operations. Another memory partition of the memory is allocated to another component. In some cases, the other component can be realized as a system-level cache. Thus, a processing component that performs high-bandwidth memory accesses can utilize a memory that is proximate to the computational circuitry thereof while the system can adaptively provide cache services for multiple components without resorting to a separate, cache-only memory.

Various alternative implementations are described herein. For example, the shareable memory can be divided into memory portions with each memory portion corresponding to a channel between the memory and a multi-component cache controller. This provides independent logical channels that can be combined to provide greater bandwidth. Each respective memory portion of multiple memory portions can also be associated with a respective computation unit of multiple computation units of a processing component. In such situations, the processing component can include multiple tiles with each respective tile having a respective memory portion and a respective computation unit. This enables higher memory access bandwidth and greater processing parallelism.

Each memory can be organized into multiple banks, and each memory portion can realize the multiple banks as multiple contiguous ways for cache memory operations. The banks can be selectively allocated into different memory partitions using one or more multiplexers. Memory-sharing logic circuitry can control access to an allocated memory partition using the multiplexers to enhance security and establish exclusive access for the component to which the memory partition has been allocated. As a further security precaution, each component can program a predetermined value (e.g., all zeros) into an allocated memory partition before relinquishing the memory partition for subsequent allocation to another component. Additionally, separate power domains can be architected such that a sleep mode can be enacted for at least part of a component independently of a power mode applied to a shared memory. Other implementations are described herein.

In these manners, a shared memory can be established to reduce a total amount of memory capacity included in a system, such as an SoC, without appreciably reducing performance. This reduces a size and cost of an IC chip that supports the system. Alternatively, the size and cost of the IC chip can be substantially unchanged while the performance of the system is increased by implementing memory sharing as described herein. Further, performance relative to power consumption can be enhanced by selectively allocating a larger memory partition to a component that can operate more power efficiently with a larger memory capacity with a current processing task.

Example implementations in various levels of detail are discussed below with reference to the associated figures. The discussion below first sets forth an example operating environment and then describes example hardware, schemes, and techniques. Example methods are described thereafter with reference to flow charts or diagrams.

Example Operating Environment for Memory Sharing

FIG. 1 illustrates, at 100 generally, an example apparatus 102 with an integrated circuit 104 (IC 104) that includes multiple components 110-1 and 110-2 that can share a memory 106. In this example, the apparatus 102 is depicted as a smartphone. However, the apparatus 102 may be implemented as any suitable computing or electronic device. Examples of the apparatus 102 include a mobile electronic device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing or watch), Internet of Things (IoTs) device, sensor, stock management device, electronic portion of a machine or a piece of equipment, server computer or portion thereof (e.g., a server blade or rack), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-chip (SoC), a security-oriented IC, a memory chip, a communications IC (e.g., a modem or radio frequency IC), a graphics processor, an artificial intelligence (AI) processor, combinations thereof, and so forth. As shown, the integrated circuit 104 includes at least one memory 106 and multiple components, including a first component 110-1 and a second component 110-2. The memory 106, the first component 110-1, and the second component 110-2 may be integrated together on a single IC as shown; alternatively, the components and memory may be distributed across two or more ICs.

In example operations, the multiple components 110-1 and 110-2 share the memory 106. As shown, the memory 106 is separated into multiple memory partitions 108-1 and 108-2. The first memory partition 108-1 is allocated to the first component 110-1, and the second memory partition 108-2 is allocated to the second component 110-2. Thus, the first memory partition 108-1 provides storage for the first component 110-1, and the second memory partition 108-2 provides storage for the second component 110-2. As indicated by an arrow 112, the size or capacity of each memory partition 108 can be increased or decreased. For instance, a capacity of the first memory partition 108-1 can be increased while a capacity of the second memory partition 108-2 is decreased.

Although one memory 106, two components 110, and two memory partitions 108 are explicitly depicted in FIG. 1 and described above, a different quantity of each may be implemented instead. For instance, an integrated circuit 104 may include five components 110 and two memories 106, one of which can be separated into two or three memory partitions 108 that are shared by up to three components 110. Generally, the memory 106 can be separated into "X" memory partitions 108, with "X" representing an integer of two or greater. Example architectures of the integrated circuit 104 are described next with reference to FIG. 1-1.

FIG. 1-1 illustrates an example integrated circuit 104 that includes at least one memory 106, at least one multi-component cache controller 114, and multiple other components. The integrated circuit 104 further includes at least one processing component 116, at least one multi-component memory controller 118, and at least one switch fabric 122. As shown, the integrated circuit 104 includes "P" processing components 116-1, 116-2, . . . , 116-P, with "P" representing a positive integer. The integrated circuit 104 also includes "C" multi-component cache controllers 114-1, 114-2, . . . , 114-C and "C" multi-component memory controllers 118-1, 118-2, . . . , 118-C, with "C" representing a positive integer. The integrated circuit 104 further includes three switch fabrics 122-1, 122-2, and 122-3 and at least one system memory 120. Although particular example quantities for each component are depicted in FIG. 1-1 and described herein (e.g., one memory 106 and three switch fabrics 122), an integrated circuit 104 can be implemented with alternative quantities of such components (e.g., three or seven memories 106 and one or four switch fabrics 122).

In example implementations, each respective multi-component cache controller 114 of the multiple multi-component cache controllers 114-1 . . . 114-C is coupled to and associated with a respective multi-component memory controller 118 of the multiple multi-component memory controllers 118-1 . . . 118-C. The multi-component entities may also be referred to as system-level entities. For instance, the multi-component cache controller 114 may be referred to as a system-level cache controller 114. Each multi-component memory controller 118 provides access to the system memory 120 by generating and organizing memory requests. The system memory 120 may be realized, for example, with dynamic random-access memory (DRAM). Alternatively or additionally, the system memory 120 may be realized with static random-access memory (SRAM), flash memory, a magnetic disk drive, and so forth.

The multi-component cache controller 114 provides cache services to one or more components having overflow data using at least one memory. The multi-component cache controller 114 can use a local and/or dedicated memory as cache memory or can use another memory, such as the memory 106, through memory sharing as is described herein. Each multi-component cache controller 114 of the multiple multi-component cache controllers 114-1 . . . 114-C is coupled to a first switch fabric 122-1. A second switch fabric 122-2 and a third switch fabric 122-3 are each coupled to the first switch fabric 122-1. Thus, the second switch fabric 122-2 is coupled to the third switch fabric 122-3 via the first switch fabric 122-1. Each switch fabric 122 can be implemented as a bus, an interconnect, a serial or parallel conduit for address or data information, multiple parallel wires with buffers, and so forth.

As shown, a first processing component 116-1 and a second processing component 116-2 are both coupled to the second switch fabric 122-2. A "Pth" processing component 116-P and the memory 106 are both coupled to the third switch fabric 122-3. Each processing component 116 can be realized as, for example, a general-purpose processor (e.g., a central processing unit (CPU), a graphics processor (e.g., a graphics processing unit (GPU)), a communication processor (e.g., a modem), an artificial intelligence (AI) processor (e.g., a neural network accelerator), a digital signal processor (DSPs), or a controller. Controllers can include bus controllers, input/output controllers, microcontrollers, and so forth.

In example operations, at least two components share the memory 106. The memory 106 may be realized, for example, with SRAM. Alternatively or additionally, the memory 106 may be realized with DRAM. For example, the first processing component 116-1 and the second processing component 116-2 can share the memory 106 using the first memory partition 108-1 and the second memory partition 108-8, respectively. Similarly, the "Pth" processing component 116-P and a second multi-component cache controller 114-2 can share the memory 106. To do so, the first memory partition 108-1 can be allocated to the "Pth" processing component 116-P, and the second memory partition 108-2 can be allocated to the second multi-component cache controller 114-2. In this case, the "Pth" processing component 116-P can use the first memory partition 108-1 directly to store information. The second multi-component cache controller 114-2 can use the second memory partition 108-2 as a cache memory. The second multi-component cache controller 114-2 can therefore provide cache services to one or more other components, such as the first and second processing components 116-1 and 116-2, by storing data or overflow data for these components in the second memory partition 108-2 of the memory 106.

In FIG. 1-1, the system memory 120 is illustrated as being part of the integrated circuit 104, which can be disposed on a single IC chip. The system memory 120 can alternatively be disposed on a separate IC chip, such as on a different IC chip that is mounted on a same PCB. Further, one or more other ones of the illustrated components can likewise be disposed on separate IC chips. The memory 106 is depicted in FIG. 1-1 as being a separate memory component that is coupled to the second multi-component cache controller 114-2 via two switching fabrics. The memory 106 can, however, be disposed in other locations of the integrated circuit 104. Examples of such other locations are described below with reference to FIG. 2.

Example Schemes, Techniques, and Hardware for Memory Sharing

Figure 2:
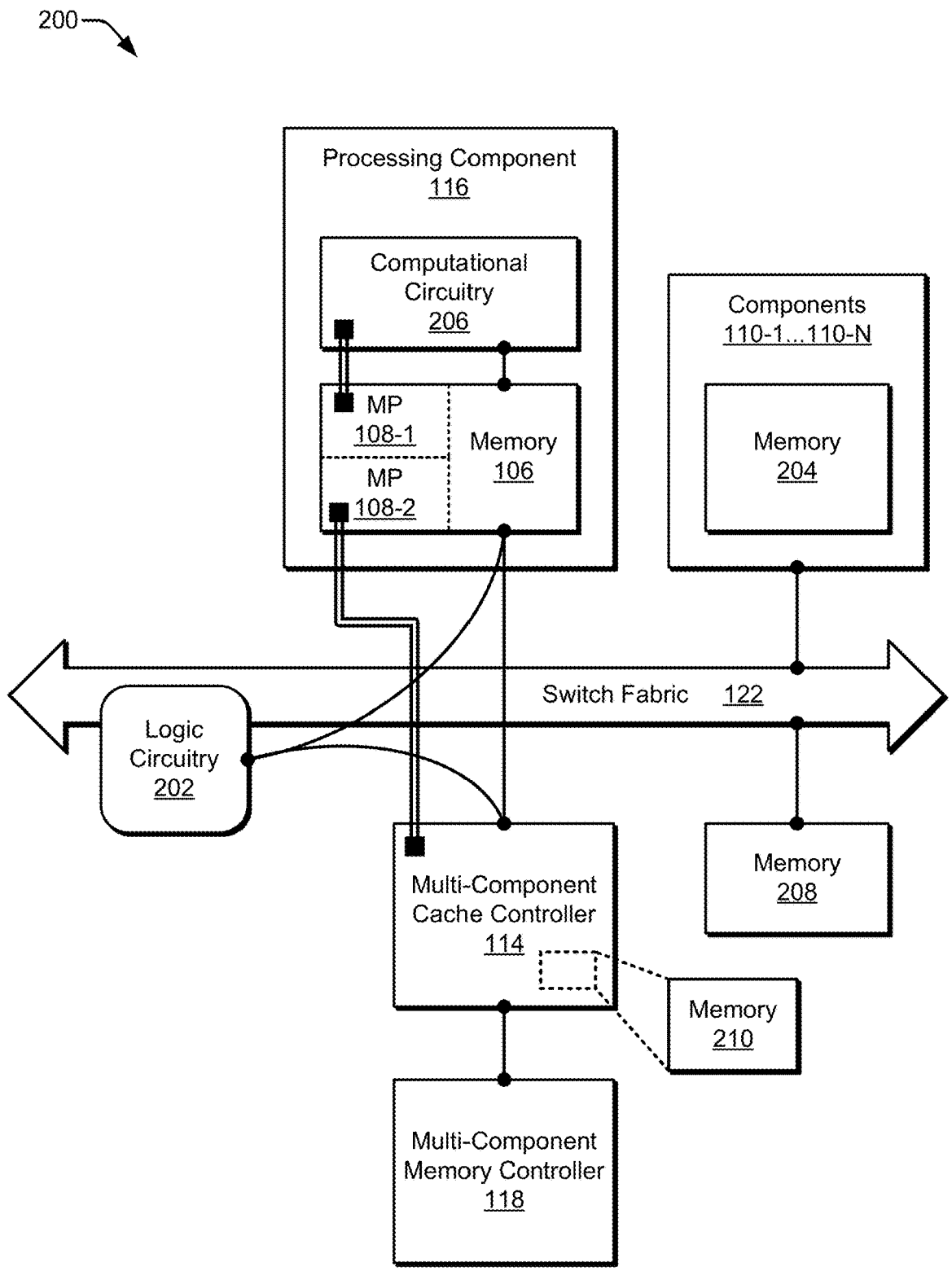
FIG. 2 illustrates an example circuit arrangement in which a memory is shared by a processing component and a multi-component cache controller using multiple memory partitions.
Figures 1, 2:
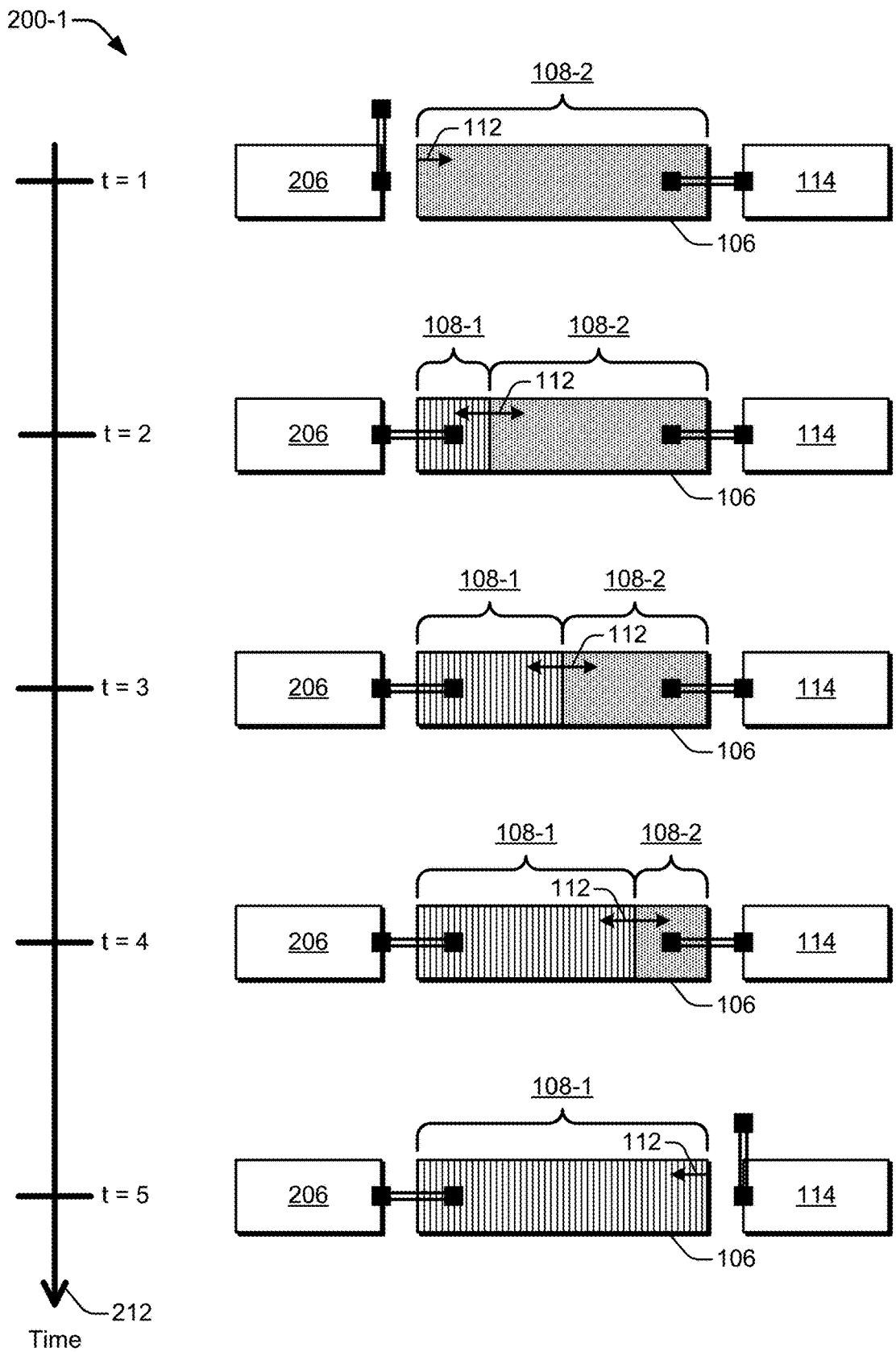

FIG. 2 illustrates an example circuit arrangement 200 in which a memory 106 is shared by a processing component 116 and a multi-component cache controller 114 using multiple memory partitions 108-1 and 108-2. As illustrated, the circuit arrangement 200 also includes a switch fabric 122, a multi-component memory controller 118, logic circuitry 202, and multiple components 110-1 . . . 110-N, where "N" represents a positive integer. The processing component 116 includes the memory 106 and computational circuitry 206. The memory 106 can be separated into a first memory partition 108-1 (MP 108-1) and a second memory partition 108-2 (MP 108-2). Other example memories that are depicted include a memory 204, a memory 208, and a memory 210. Any one or more of the memories 204, 208, or 210 can be shared in accordance with the principles that are described herein.

Generally, in addition to the depicted "N" components 110-1 . . . 110-N, the term "components" can include the processing component 116, the logic circuitry 202, the multi-component cache controller 114, the multi-component memory controller 118, a memory, and so forth. Thus, although it is not so illustrated explicitly in FIG. 2, the multiple components 110-1 . . . 110-N can include at least one processing component 116, one or more other components, and the like. In some implementations, a processing component 116 includes a memory 106 and computational circuitry 206. Here, the processing component 116 may pertain to a core or discrete resource having computing and associated storage capabilities. The processing component 116 can include the memory 106 and the computational circuitry 206 due to one or more factors, including a combination of such factors. First, in some operational circumstances, the memory 106 and the computational circuitry 206 can be powered up or down together as part of the processing component 116 while another processing component remains powered, even if the memory 106 and the computational circuitry 206 are in separate power domains and can also be separately powered up and down.

Second, the memory 106 and the computational circuitry 206 can be disposed in a same area or region of an IC chip that is designated for, or corresponds to, the processing component 116. Third, the memory 106 can be physically closer to the computational circuitry 206 of the given processing component 116 than to the multi-component cache controller 114 or the computational circuitry of other processing components. Smaller physical distances can allow for shorter switch fabric paths or ones with fewer buffers to enable faster memory accesses. Fourth, the memory 106 can be included as part of the processing component 116 based on the memory 106 having a port or channel dedicated to enabling access by the computational circuitry 206 of the processing component 116—e.g., but the port or channel does not also permit access by other computational circuitry of other processing components. Thus, in one or more of these example manners, the processing component 116 can include the memory 106 and the computational circuitry 206.

In example implementations, the computational circuitry 206 is coupled to the memory 106. The multi-component cache controller 114 is also coupled to the memory 106, which coupling may be through the switch fabric 122. The logic circuitry 202 is coupled to the multi-component cache controller 114 and the memory 106. In FIG. 2, selected example direct or indirect electrical couplings are depicted using a line that is terminated on both ends with a dot or solid circle. The logic circuitry 202 may be located with the processing component 116, with the multi-component cache controller 114, or separately from either (as shown). Further, the logic circuitry 202 may be distributed across two or more locations, including partially at the processing component 116, partially at the multi-component cache controller 114, or partially elsewhere, such as at another controller, the switching fabric 122, or another component.

The logic circuitry 202 can selectively separate the memory 106 into multiple memory partitions 108, such as the two memory partitions 108-1 and 108-2. As used herein, the term "selectively separate" generally refers to the ability to vary the amount or proportion of the memory 106 that is allocated to each memory partition 108. In other words, the relative capacities of the memory partitions 108, which are allocated to different components, are adjustable to accommodate fluctuating demands of the different components without dedicating individual memories to each component. In FIGS. 2 and 2-1, memory allocations are represented using double lines that are terminated at both ends with squares. The first memory partition 108-1 is allocated to the computational circuitry 206 and provides storage to the computational circuitry 206. The second memory partition 108-2 is allocated to the multi-component cache controller 114 and provides storage to the multiple components 110-1 . . . 110-N or other cache service clients of the multi-component cache controller 114. For example, the multi-component cache controller 114 can provide cache services to at least a portion of the multiple components 110-1 . . . 110-N with the second memory partition 108-2. Thus, the multiple components 110-1 . . . 110-N can store information, such as overflow data, in the second memory partition 108-2 of the memory 106 using the cache services provided by the multi-component cache controller 114.

Meanwhile, the processing component 116 can also use a portion of the memory 106 for storage. For example, the computational circuitry 206 can store information in the first memory partition 108-1 of the memory 106. The computational circuitry 206 performs computation in accordance with at least one processing regime. Example processing regimes include general code processing, graphics processing (e.g., rendering three-dimensional images), AI processing (e.g., accelerating AI algorithms), digital signal processing (e.g., signal modulation or pre-distorting a signal), and so forth. Regarding AI processing, an example is implementation of a neural network model. A neural network accelerator can use the first memory partition 108-1 as, for instance, a scratchpad to store intermediate nodal values, weights, biases, activation values, and so forth.

In the example arrangement of FIG. 2, a memory being shared between two or more components is the memory 106. Here, the memory 106 is physically proximate to, and can be associated with, the processing component 116, including the computational circuitry 206 of the processing component 116. This proximity reduces signaling transmission times and can reduce an amount of buffering or switching circuitry, which also slows signal transmissions. Accordingly, the computational circuitry 206 can operate more quickly by using the physically proximate memory 106. Moreover, the memory 106 can be tailored or tuned to facilitate the performance of the particular processing regime of the computational circuitry 206, such as neural network acceleration. In these manners, performance of the processing component 116 can be substantially unaffected by the sharing of the memory 106 with other components for caching or another purpose.

Although not explicitly indicated in FIG. 2, the multi-component cache controller 114 or the processing component 116 (or both) are examples of other components like the multiple components 110-1 . . . 110-N. The multi-component cache controller 114 can cache data for another component, including any of the multiple components 110-1 . . . 110-N, regardless of whether a given component 110 includes its own block of memory 204. In operation, the multi-component cache controller 114 receives one or more requests to cache data from the component 110. To do so, the multi-component cache controller 114 stores the indicated data in the second memory partition 108-2 of the memory 106.

As shown in FIG. 2, the example circuit arrangement 200 includes other memories—besides the memory 106—that are disposed at other locations. Each of these memories (e.g., a memory block 204, 208, or 210) may be shared between two or more components. For example, the memory 204 is associated with a component 110 of the multiple components 110-1 . . . 110-N. The memory 204 can be shared, for example, with another component 110 of the multiple components 110-1 . . . 110-N, with the processing component 116, or with the multi-component cache controller 114, including with both the processing component 116 and the multi-component cache controller 114. The memory 208 is a standalone component and is not associated with any particular other component. Nonetheless, the memory 208 may be shared between two or more other components. The memory 210 is associated with the multi-component cache controller 114 and can be shared with at least one other component, such as with the processing component 116 or both the processing component 116 and a particular component 110 of the multiple components 110-1 . . . 110-N.

Although the example circuit arrangement 200 is depicted with one processing component 116, a given architecture may include multiple processing components. Thus, the processing component 116 can realize a first processing component 116-1 (of FIG. 1-1), the computational circuitry 206 can realize first computational circuitry, and the memory 106 can realize a first memory. The multiple components 110-1 . . . 110-N can include a second processing component 116-2 (of FIG. 1-1). The second processing component 116-2 can include second computational circuitry (not explicitly shown) and a second memory (not explicitly shown) that is coupled to the second computational circuitry. With the second processing component 116-2, the logic circuitry 202 is also coupled to the second memory. Further, the logic circuitry 202 can selectively separate the second memory into additional memory partitions. The additional memory partitions include a first additional memory partition and a second additional memory partition. The first additional memory partition is allocated to the second computational circuitry and provides storage to the second computational circuitry. The second additional memory partition is allocated to the multi-component cache controller 114 and provides additional storage to at least some of the multiple components. Thus, the multi-component cache controller 114 can provide cache services to multiple components using memory shared by two or more processing components. Alternatively, a second multi-component cache controller can provide cache services to the multiple components using memory shared by the second processing component. Other architectures may also be implemented.

The logic circuitry 202 can create and coordinate the separation of the memory 106 into the multiple memory partitions 108-1 and 108-2. Further, the logic circuitry 202 can enforce separate access to the respective memory partitions. For instance, the computational circuitry 206 can be permitted access to the first memory partition 108-1 and denied access to the second memory partition 108-2. Conversely, the multi-component cache controller 114 can be permitted access to the second memory partition 108-2 but denied access to the first memory partition 108-1. This security aspect of memory sharing is described further herein below. The logic circuitry 202 can also establish the relative sizes or capacities of the multiple memory partitions 108-1 and 108-2. Example capacity proportions are described next with reference to FIG. 2-1.

FIG. 2-1 illustrates, at 200-1 generally, example capacity proportions to flexibly share the memory 106 using memory partitions 108 of different sizes. Different capacity proportions are depicted at five different times t=1 to t=5 as indicated by a time axis 212. At each time "t," the computational circuitry 206, the multi-component cache controller 114, or both the computational circuitry 206 and the multi-component cache controller 114 are allocated a memory partition 108 of the memory 106. The computational circuitry 206 is allocated the first memory partition 108-1, which is depicted with a vertical line pattern. The multi-component cache controller 114 is allocated the second memory partition 108-2, which is depicted with a dotted pattern. The logic circuitry 202 (e.g., of FIG. 2) can arbitrate access to the memory 106. The arbitration can entail providing exclusive access to a respective memory partition 108 for the associated component. For example, the logic circuitry 202 can arbitrate access to the memory 106 to provide exclusive access to the first memory partition 108-1 by the computational circuitry 206 of the processing component 116. The logic circuitry 202 can further provide exclusive access to the second memory partition 108-2 by the multi-component cache controller 114 on behalf of one or more components of the multiple components 110-1 . . . 110-N.

In example implementations, at time t=1, the second memory partition 108-2 occupies the entire capacity of the memory 106. This can occur, for instance, if the computational circuitry 206 is in a sleep state (e.g., is power gated) or otherwise nonoperational. Hence, all the memory banks of the memory 106 can be released for use by the multi-component cache controller 114. At time t=2, the first memory partition 108-1 occupies 25% of the memory 106, and the second memory partition 108-2 occupies 75% of the memory 106. Example procedures for awakening the computational circuitry 206 and for transferring access rights of a portion of the memory 106 between two components are described below. At time t=3, the computational circuitry 206 is performing more intensive computations and requests additional storage space. Accordingly, the first memory partition 108-1 occupies 50% of the memory 106, and the second memory partition 108-2 also occupies 50% of the memory 106. This 50-50 split can also be designated as a default or boot-up memory allocation scenario.

At time t=4, the computational circuitry 206 has requested still more capacity. From time t=3 to time t=4, the computational circuitry 206 is allocated 25% more of the capacity of the memory 106, and the multi-component cache controller 114 is deallocated from that 25%. The first memory partition 108-1 then corresponds to 75% of the memory 106, and the second memory partition 108-2 is reduced to 25% of the memory 106. Thus, at time t=4, the multi-component cache controller 114 can utilize one-fourth of the memory 106 to provide cache services. At time t=5, the computational circuitry 206 is assigned the full 100% capacity of the memory 106, so the first memory partition 108-1 can occupy all banks of the memory 106. This can be beneficial for intensive use cases, such as automatic speech recognition (ASR) with an AI accelerator. In some cases, an entire machine learning model, or at least a layer thereof, may consume the entirety of the memory 106. At time t=5, the multi-component cache controller 114 is therefore unable to provide cache services to other components using the memory 106. The multi-component cache controller 114 may thus operate in a pass-through mode with respect to the multi-component memory controller 118 accessing the system memory 120 (e.g., of FIGS. 1-1 and 2). Alternatively, the multi-component cache controller 114 may be able to provide cache services using another memory, such as the memory 204, 208, or 210 of FIG. 2.

The five adjustable memory-allocation proportions are illustrated in a particular way in FIG. 2-1 by way of example only. Specifically, the allocation proportions start with the first memory partition 108-1 lacking any capacity but then increasing monotonically with a constant step-size. In operation, however, memory allocation proportions may be initiated or may change in different ways. For example, the computational circuitry 206 may initially be allocated all the capacity of the memory 106, or each of the computational circuitry 206 and the multi-component cache controller 114 may be allocated 50% of the memory 106. Also, the first memory partition 108-1 may "jump" from 25% to 100% without stepping through other percentages. Further, the second memory partition 108-2 may increase after time t=3 to 75% or 100% instead of continuing to decrease (e.g., because the first memory partition 108-1 has started decreasing). The percentage steps between different allocation proportions can also vary. For instance, the first memory partition 108-1 can climb from 25% to 45% to 60% of the memory 106 across two percentage increases from 25%.

Each available memory allocation partition may be assigned a corresponding partition identifier (PID), such as one to five if there are five potential partition proportions. The illustrated time indications of t=1 to t=5 may therefore alternatively represent partition IDs of 1, 2, 3, 4, and 5. The memory 106 may be of any size. In some examples, however, the memory 106 can hold 16 megabytes (16 MB) of data. In such cases, each step-size may correspond to 4 MB, or 25% of the total. With PID=1, the computational circuitry 206 is allocated 0 MB for local computing, and the multi-component cache controller 114 is allocated 16 MB for cache services. With PID=2, the computational circuitry 206 is allocated 4 MB for local computing, and the multi-component cache controller 114 is allocated 12 MB for cache services. With PID=3, the computational circuitry 206 is allocated 8 MB for local computing, and the multi-component cache controller 114 is also allocated 8 MB for cache services. With PID=4, the computational circuitry 206 is allocated 12 MB for local computing, and the multi-component cache controller 114 is allocated 4 MB for cache services. And with PID=5, the computational circuitry 206 is allocated the full 16 MB for local computing, and the multi-component cache controller 114 is allocated no memory banks from the memory 106 for cache services. In some implementations, the computational circuitry 206 or the multi-component cache controller 114 can provide a PID value to the logic circuitry 202 to request a particular memory allocation partitioning.

Figure 3:
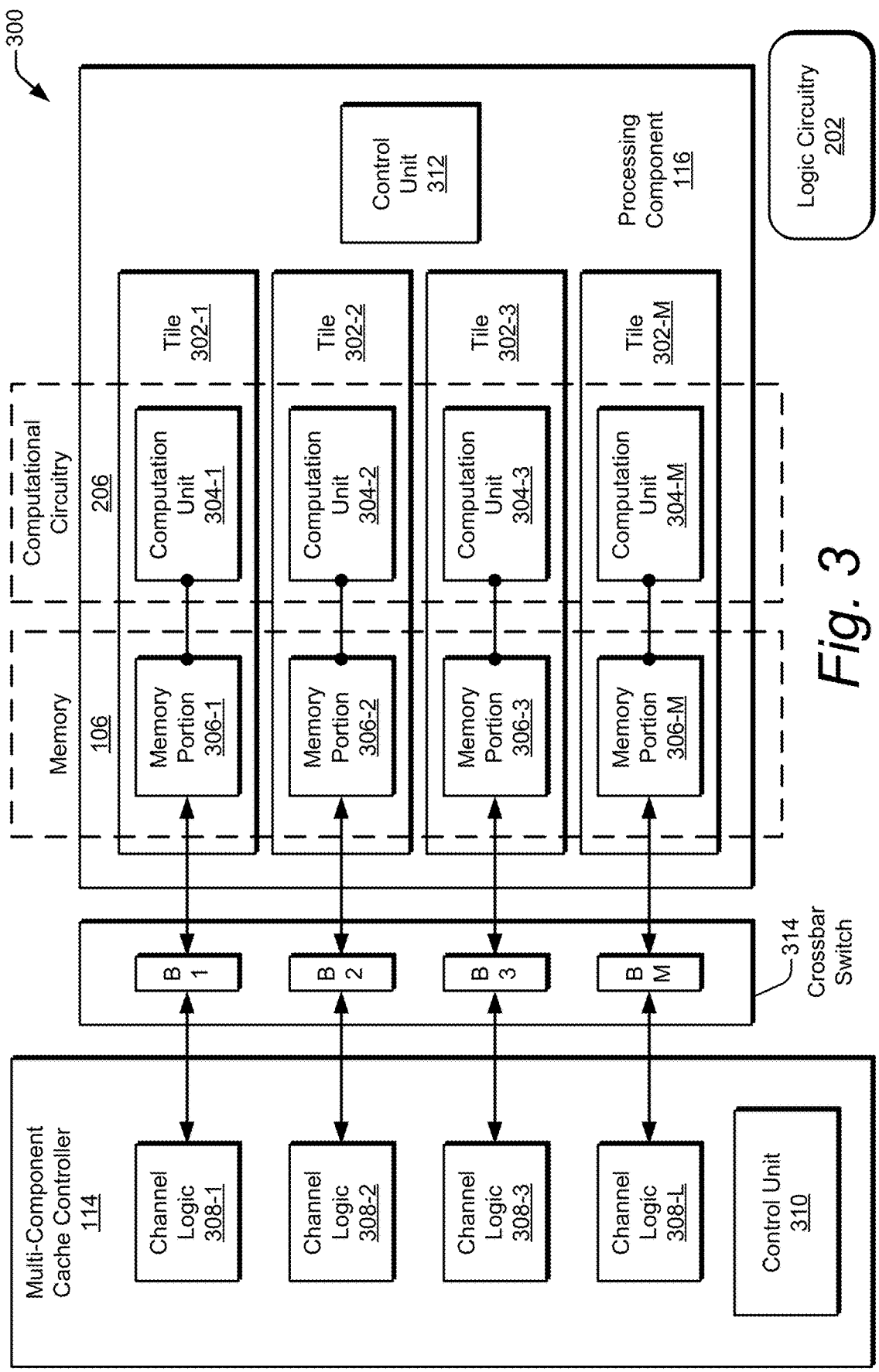
FIG. 3 illustrates an example segmented architecture for memory sharing in which a processing component includes multiple tiles and the memory is segmented into multiple memory portions.
Figures 1, 3:
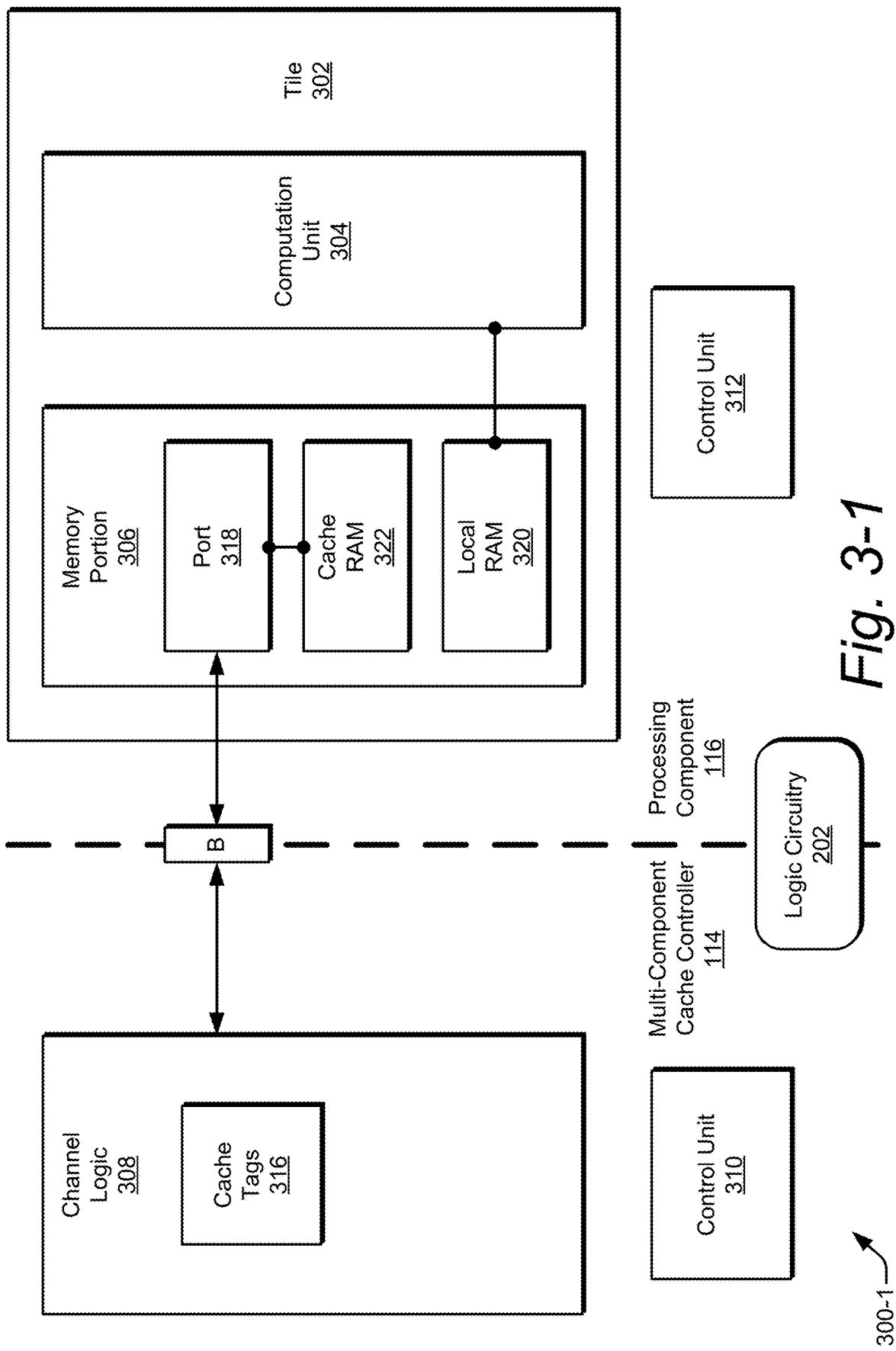
Figures 2, 3:
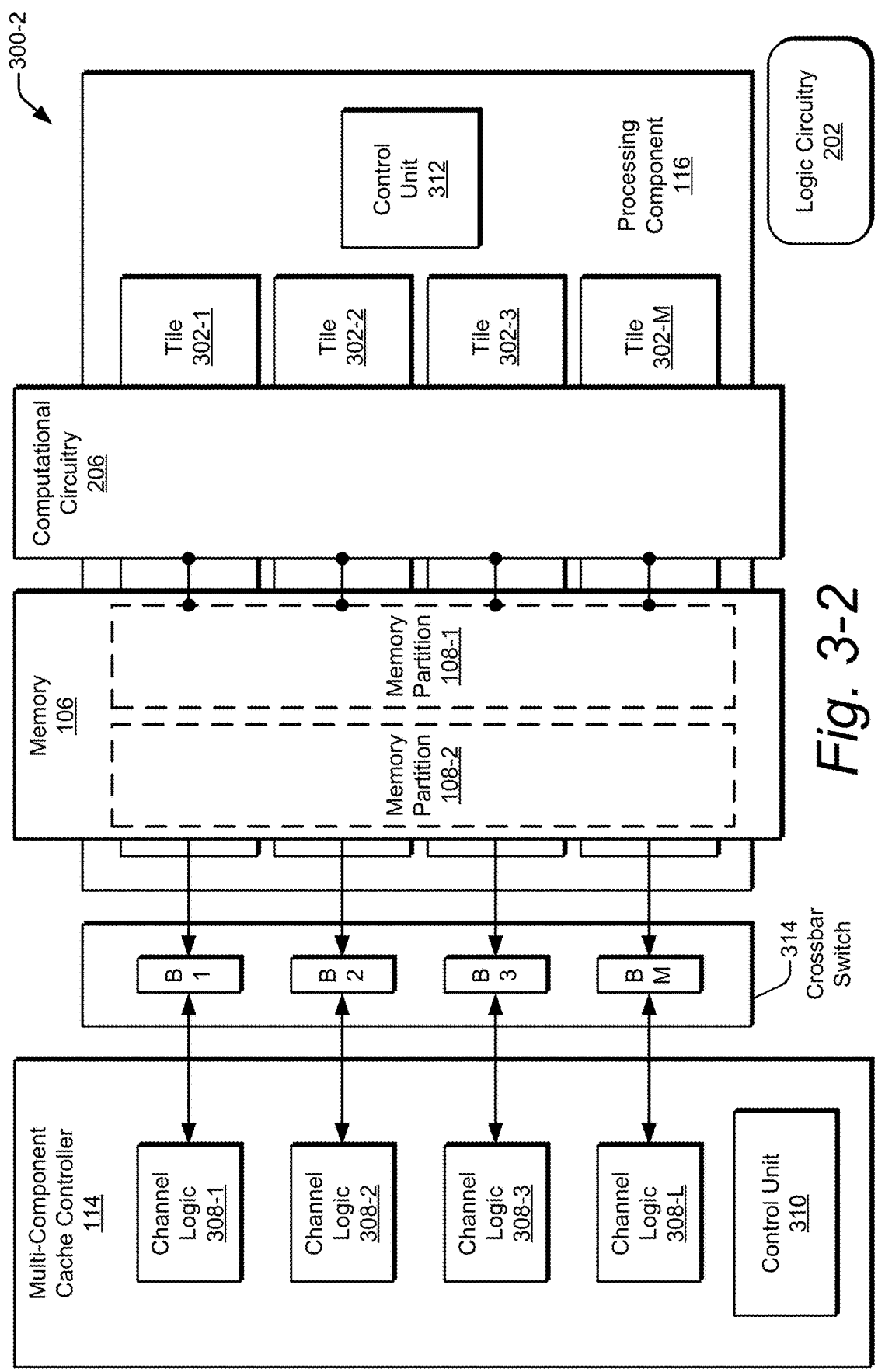

FIG. 3 illustrates an example segmented architecture 300 for memory sharing in which a processing component 116 includes multiple tiles 302. As shown, the memory 106 is segmented into multiple memory portions 306-1 . . . 306-M, and the computational circuitry 206 is segmented into multiple computation units 304-1 . . . 304-M, where "M" represents a positive integer. In example implementations, the architecture is segmented to facilitate parallel processing and parallel memory access to increase bandwidth. A computational task can be divided into respective task portions and performed in parallel using, for instance, respective tiles 302. Thus, the processing component 116 includes multiple tiles: a first tile 302-1, a second tile 302-2, a third tile 302-3, and a fourth tile 302-M, where M=4. Although four tiles are depicted and described herein, a processing component 116 can include more or fewer tiles as indicated by the variable "M." The processing component 116 also includes at least one control unit 312. The control unit 312 can create the task portions from a processing operation, such as execution of a neural network model. The control unit 312 can also assign the task portions to, and coordinate performance of them by, the multiple tiles 302-1 . . . 302-M.

Generally, the memory 106 and the computational circuitry 206 are each distributed across the multiple tiles 302-1 . . . 302-M. The memory 106 includes a first memory portion 306-1, a second memory portion 306-2, a third memory portion 306-3, and a fourth memory portion 306-M, where M=4. Thus, the memory 106 has a storage capacity that is distributed across the multiple memory portions 306-1 . . . 306-M. The computational circuitry 206 includes a first computation unit 304-1, a second computation unit 304-2, a third computation unit 304-3, and a fourth computation unit 304-M. Thus, the computational circuitry 206 has a processing capacity that is distributed across the multiple computation units 304-1 . . . 304-M.

With regard to the tiles 302, each respective tile 302 of the multiple tiles 302-1 . . . 302-M includes a respective computation unit 304 of the multiple computation units 304-1 . . . 304-M. Each respective tile 302 of the multiple tiles 302-1 . . . 302-M also includes a respective memory portion 306 of the multiple memory portions 306-1 . . . 306-M. For example, the first tile 302-1 includes the first computation unit 304-1 and the first memory portion 306-1, and the second tile 302-2 includes the second computation unit 304-2 and the second memory portion 306-2. Each respective memory portion 306 is coupled to a respective computation unit 304 for a given respective tile 302. For example, the first memory portion 306-1 is coupled to the first computation unit 304-1, and the second memory portion 306-2 is coupled to the second computation unit 304-2.

As shown, the multi-component cache controller 114 includes multiple instances of channel logic 308 and at least one control unit 310. As illustrated, the multi-component cache controller 114 includes "L" instances of channel logic: first channel logic 308-1, second channel logic 308-2, third channel logic 308-3, and fourth channel logic 308-L, where L=4. In some cases, a quantity "L" of instances of channel logic 308 is the same as a quantity "M" of tiles 302 of the processing component 116. In other words, there may be a one-to-one correspondence between channel logic 308 and tiles 302, including each memory portion 306 of each tile 302.

The multi-component cache controller 114 can include tags to implement cache memory functionality using the memory 106. The tag data for each respective memory portion 306 can be stored, for instance, at the respective channel logic 308. An example of channel logic 308 with tag data is described below with reference to FIG. 3-1. The control unit 310 is responsible for performing cache management operations. Examples of cache management operations include checking for cache hits and misses, implementing a replacement policy, writing back to the system memory 120 (e.g., of FIG. 1-1) dirty data that is being evicted, communicating with other components (e.g., cache clients), communicating with a respective multi-component memory controller 118 (e.g., of FIGS. 1-1 and 2), and so forth.

In some implementations, the multi-component cache controller 114 is coupled to the processing component 116 via at least one switch fabric, like a crossbar switch 314. The crossbar switch 314 includes multiple buffers, including the illustrated first buffer B1, second buffer B2, third buffer B3, and fourth buffer BM, where M=4. The crossbar switch 314 can also include multiple switches to facilitate the exchange of data between the memory 106 and the multi-component cache controller 114. In operation, the crossbar switch 314 enables communication between a respective channel logic 308 and a respective memory portion 306 using a respective buffer B in a one-to-one correspondence scenario.

The crossbar switch 314 can, however, enable communication between the channel logic 308 and the memory 106 in general scenarios beyond those with a one-to-one correspondence. For example, the memory 106 can include "M" memory portions 306-1 . . . 306-M, and the multi-component cache controller 114 can include channel logic 308 with "L" channels, where "M" does not equal "L." In such cases, the crossbar switch 314 couples the channel logic 308 to the memory 106. Thus, the crossbar switch 314 provides "M×L" switching between the multiple memory portions 306-1 . . . 306-M of the memory 106 and the multiple channels of the channel logic 308-1 . . . 308-L.

The logic circuitry 202 facilitates and enables control of the sharing of the memory 106 between the computational circuitry 206 and the multi-component cache controller 114. This is described further with reference to FIGS. 3-1, 3-2, 4, 4-1, and 4-2. In example operations, the logic circuitry 202 separates the memory 106 into multiple memory partitions 108. A first memory partition 108-1 (e.g., of FIGS. 2 and 2-1) can be distributed across the multiple memory portions 306-1 . . . 306-M, and a second memory partition 108-2 can also be distributed across the multiple memory portions 306-1 . . . 306-M. Example distributions of memory partitions 108 are described below across multiple memory portions 306-1 . . . 306-M with reference to FIG. 3-2 and across one memory portion 306 with reference to FIG. 4-1.

FIG. 3-1 illustrates an example portion 300-1 of the segmented architecture of FIG. 3, including a tile 302 and associated channel logic 308. Generally, the processing component 116 hosts the memory 106, as shown in FIG. 3. In FIG. 3-1, the tile 302 hosts the memory portion 306 of the memory 106. The memory portion 306 can be realized as random access memory (RAM). RAM examples include static RAM (SRAM), which is relatively faster, and dynamic RAM (DRAM), which is relatively smaller and less expensive. In cache memory environments, for instance, SRAM can be utilized to enable higher memory access rates. The memory portion 306 exposes a port 318 for the channel logic 308. Thus, the memory 106 can expose a port 318 per channel of the channel logic 308 of the multi-component cache controller 114 that is accessing the RAM.

Due to the memory partitioning, the memory portion 306 is logically separated into a local RAM 320 that supports the computation unit 304 and a cache RAM 322 that is coupled the channel logic 308 to support a client of the control unit 310. The channel logic 308 of the multi-component cache controller 114 accesses the cache RAM 322 for reads and writes using the port 318 via the buffer B of the crossbar switch 314 (of FIG. 3). The control unit 310 uses the cache tags 316 to provide system-level cache services to other components. The cache tags 316 can indicate the upper bits of an address of data that is currently stored as a cache line in a way of the cache RAM 322. The logic circuitry 202 can activate or deactivate a portion of the multiple cache tags 316 based on a capacity of the memory partition (e.g., a current size of the cache RAM 322) being increased or decreased, respectively. Memory banks and corresponding cache ways are described next, starting with FIG. 3-2.

FIG. 3-2 illustrates another example segmented architecture 300-2 for memory sharing in which a processing component 116 includes multiple tiles 302-1 . . . 302-M. The first memory partition 108-1, which is allocated to the processing component 116, and the second memory partition 108-2, which is allocated to the multi-component cache controller 114, are both depicted. Each memory partition 108 is shown being distributed across the multiple tiles 302-1 . . . 302-M, and thus across the multiple memory portions 306-1 . . . 306-M (as shown in FIG. 3). With reference to FIG. 3-2, specific values are provided for some components by way of example only. Here, the memory 106 includes 16 MB distributed across four memory portions 306 (e.g., of FIGS. 3 and 3-1) having 4 MB apiece. Each respective memory portion 306 includes a respective 64 memory banks. The 64 memory banks can be operated as up to 64 cache ways for the cache RAM 322 (of FIG. 3-1) if the local RAM 320 is not allocated any memory banks.

In example implementations, the processing component 116 hosts the memory 106, and the processing component 116 can use the memory 106 as unified memory (e.g., as a scratchpad for weight and activation storage for neural network environments). Each tile 302 exposes a 64-byte (64B) port 318 (of FIG. 3-1) that can be used by a single channel of the multi-component cache controller 114 to access the memory 106. In some cases, although the processing component 116 hosts the memory 106, the multi-component cache controller 114 nonetheless owns the memory resource. Thus, the logic circuitry 202 can be part of the multi-component cache controller 114. In other cases, however, the processing component 116 can own the memory resource. The shareable memory 106 is organized such that the memory partition 108 that is requested by the processing component 116 maps to a collection of banks that correspond to contiguous ways for a cache that is implemented by the multi-component cache controller 114. For instance, if a total capacity of the memory 106 is 16 MB, an 8 MB allocation of the memory 106 for the processing component 116 maps to 32 of 64 ways.

In some implementations, the logic circuitry 202 of the multi-component cache controller 114 establishes a cache partition table such that each memory allocation request maps to a cache Partition ID (PID) having a set of contiguous cache ways. The processing component 116 can make memory partition requests/releases to the logic circuitry 202 of the multi-component cache controller 114 using a Partition ID. The availability of a given Partition ID can be enabled/disabled through a software driver. The logic circuitry 202 of the multi-component cache controller 114 executes a partition algorithm in hardware to assign the requested ways to the PID of the processing component 116 to be used as memory banks. The multi-component cache controller 114 also flushes data to a main memory and zeros out the ways before indicating that the PID is ready to maintain data security. The ready indication can be provided to the processing component 116 through an interrupt, through a status register update, and so forth.

Once the processing component 116 is to cease using the memory partition, the processing component 116 transfers the data via direct memory access (DMA) to a main memory if any of the data is to be retained. After clearing the storage locations for increased security, the processing component 116 also releases the partition by disabling the PID. The logic circuitry 202 acts as a gatekeeper for the shared memory access by controlling bank-select signals for the memory 106, which is described below with reference to FIGS. 4 to 4-2. The logic circuitry 202 can be positioned in an always-on power domain. For instance, the logic circuitry 202 can be part of, or co-located with, a central power manager (CPM). The logic circuitry 202 recomputes the bank-select signals responsive to a changing of the size of the memory partition of the processing component 116 (e.g., the first memory partition 108-1 as illustrated). These bank-select signals can mask out requests from the multi-component cache controller 114 and the processing component 116 for those RAM banks for which the respective component does not have access under a current memory partitioning.

In some implementations, the multi-component cache controller 114 supports a memory partitioning scheme through a configurable partition table, which is referred to herein as a RAM Partition Table (RPT). The RPT can be organized in an order of priority. In other words, an "entry 1" corresponds to the highest priority partition, and an "entry 64" corresponds to a lowest priority partition, where 64 is the number of partitions supported in hardware. The RPT can be provided the first priority in the partition algorithm processing. Any unassigned banks are considered as cache ways and are processed through the way partitioning algorithm.

The RPT can include a Ram Way Vector (RWV) that is indicative of whether a particular bank is allocated to the processing component 116 or to the multi-component cache controller 114. Each PID can correspond to a different value of the RWV. In the 16 MB example with 64 ways, each bit can jointly establish the allocation of four ways using a 16-bit value. However, a different bit-to-way granularity mapping or allocation can alternatively be used. Further, memory banks/ways can be allocated using a different scheme than a RWV.

Each memory partition can be enabled or disabled by a software driver. Generally, the logic circuitry 202 of the multi-component cache controller 114 affirmatively provides a full allocation request if the requested capacity is available or can be made available. Otherwise, an allocation request can be fully or partially declined. In some cases, the multi-component cache controller 114 avoids allocating only a portion of a memory bank or way for a memory partition. Instead, the smallest granularity allocated to a given component is the memory bank or way of the shareable memory to simplify the memory sharing architecture and accelerate performance. For the memory capacity example described above and with 25% step sizes between different memory partition allocations, a smallest allocation granularity can be 16 of 64 memory banks/ways.

In an example operation, the multi-component cache controller 114 considers the memory banks assigned to computational circuitry PIDs to be in a local RAM mode and any remaining banks to be used as ways in a cache RAM mode. When transitioning from the cache RAM mode to the local RAM mode, the hardware of the multi-component cache controller 114 first cleans, invalidates, and zeros (CIZ) out the ways. The multi-component cache controller 114 also implements a barrier read (BR) to ensure that posted writes are committed to the RAM. Conversely, the multi-component cache controller 114 transitions the banks from local RAM mode to cache RAM mode when the local RAM partition is disabled. The multi-component cache controller 114 can raise the PID interrupt authorizing the local RAM partition after the CIZ & BR operations are completed.

Figure 4:
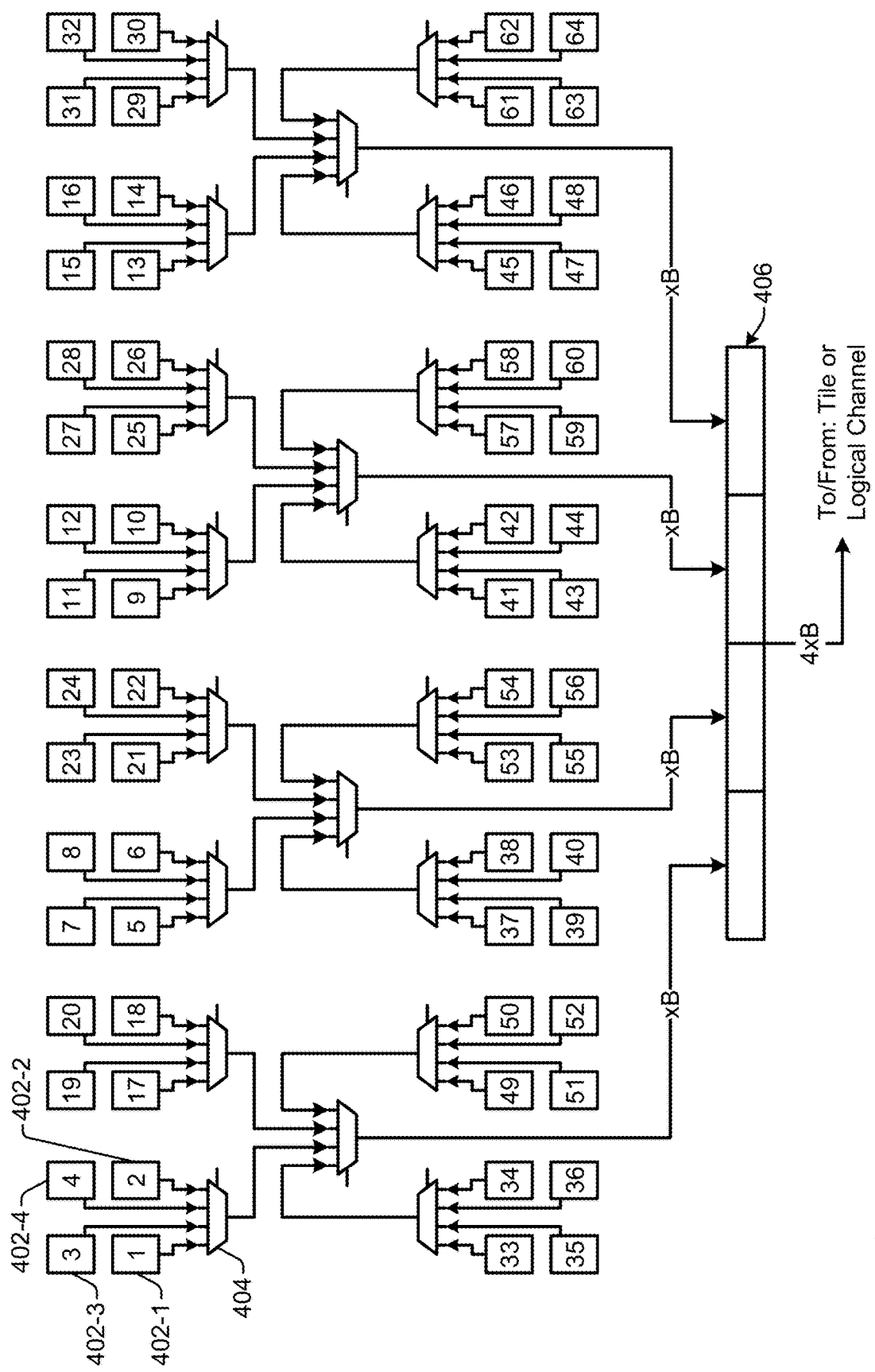
FIG. 4 illustrates an example architecture for a memory portion that includes multiple banks and multiple multiplexers.
Figures 1, 4:
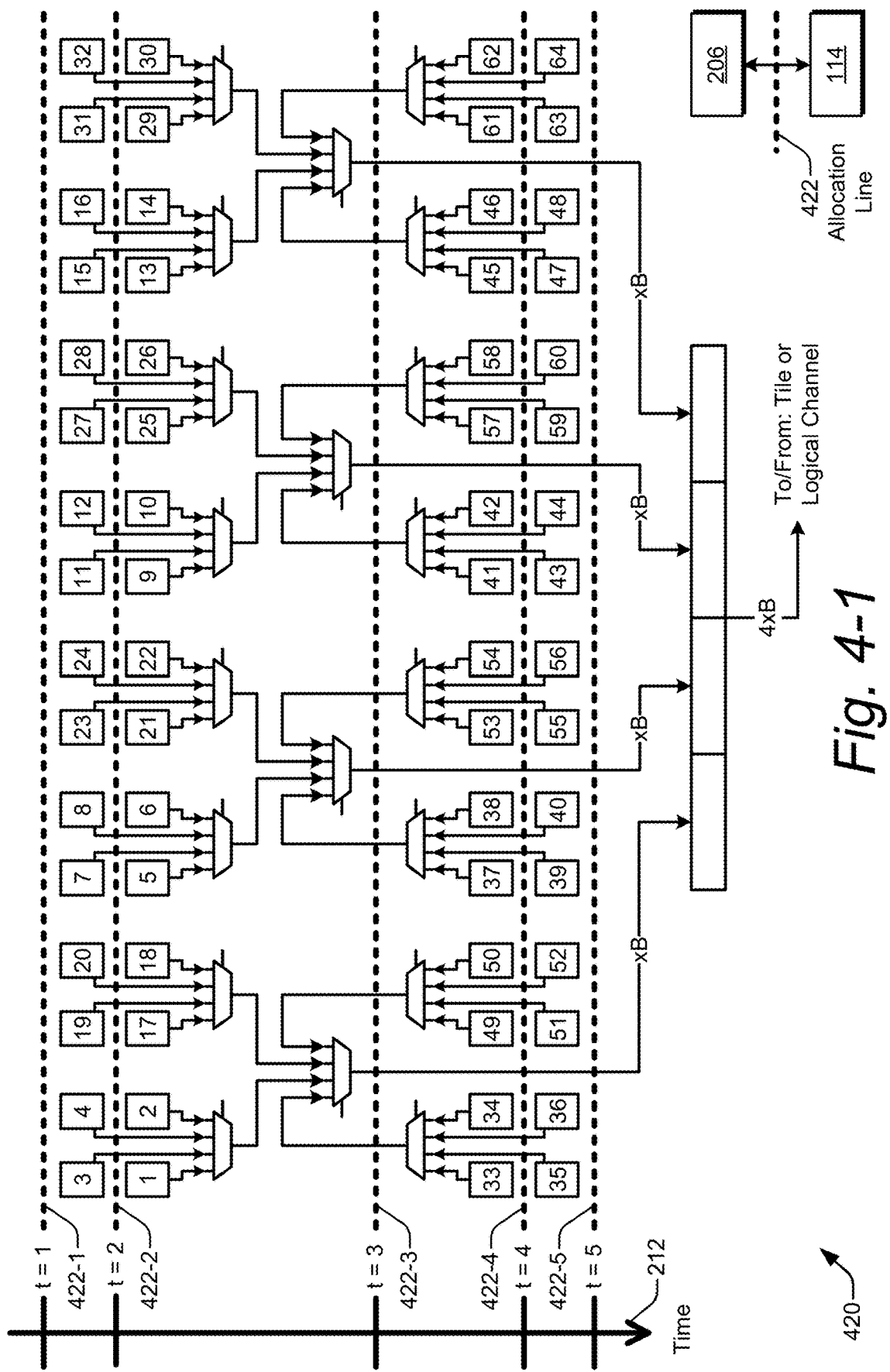
Figures 2, 4:
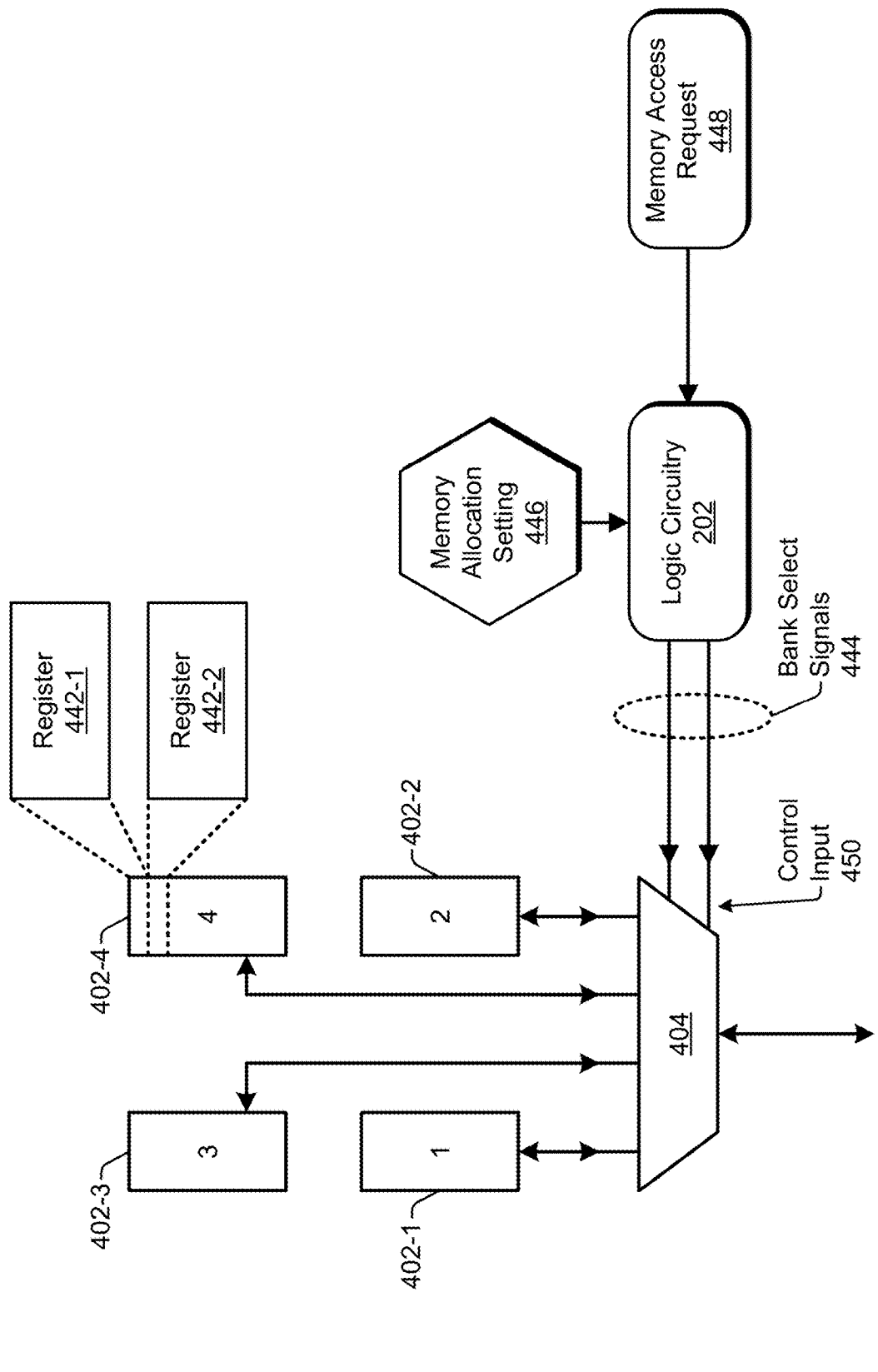

FIG. 4 illustrates an example architecture for a memory portion 306 that includes multiple banks 402 and multiple multiplexers 404. For clarity, only some of the memory banks and multiplexers are explicitly identified with a reference number. Each respective multiplexer 404 of a subset of the total illustrated multiplexers is coupled to a respective group of banks 402. Each depicted group of banks includes four banks 402; however, a group can include a different quantity of banks 402. Here, the subset of multiplexers includes 16 multiplexers. Other multiplexers of the total illustrated multiplexers are coupled to the subset of multiplexers. These other multiplexers are shown in the center of FIG. 4, are four in number, and are coupled to a buffer 406.

In example implementations, the architecture includes 64 memory banks 402 and 20 multiplexers 404. A first bank 402-1, a second bank 402-2, a third bank 402-3, and a fourth bank 402-4 are respectively coupled to four terminals of the multiplexer 404. Each of 16 multiplexers 404 are coupled to a respective group of four banks 402. The four remaining multiplexers 404 of the 20 illustrated multiplexers are coupled between those 16 multiplexers 404 and the buffer 406. Each bank 402 and data path can be "x" bytes (xB) wide. Accordingly, the buffer 406, which is coupled to four data paths, can be 4xB wide. Continuing with the numerical example provided above in which each tile 302 (e.g., of FIG. 3) has a 4 MB memory portion 306, each bank 402 is 16B wide and 4 KB deep for a bank size of 64 KB. The buffer 406 is therefore 64B wide (4×16B). However, the memory portion 306, the bank width, the bank depth, and the width of the data paths or the buffer 406 can all be greater or less than these example values.

For clarity, the data paths are depicted with one-way arrows representative of a read operation that retrieves data from one or more banks 402. The depicted architecture can, however, be implemented bidirectionally such that data is written into the banks 402. Thus, each multiplexer 404 can be bidirectional or can be realized with at least two unidirectional multiplexers. Similarly, the buffer 406 can be bidirectional or can be realized with at least two unidirectional buffers.

In example operations, each memory portion 306 can be selectively separated into two or more memory partitions 108 such that a given memory partition 108 is distributed or interleaved across multiple memory portions 306 to increase bandwidth (e.g., as shown in FIG. 3-2). In some cases, the smallest granularity for the memory partitioning is the bank 402. By avoiding partitioning at a smaller granularity level, such as a line or 16B-width of a bank, the hardware is simplified, and performance is increased with faster memory accesses. Further, the logic circuitry 202 (not shown in FIG. 4) can enforce memory partitioning for security purposes. For example, the logic circuitry 202 can control access to the memory banks 402 via the multiplexers 404 based on allocated memory partitions. Example memory partitions for a memory portion 306 are described next with reference to FIG. 4-1, and example control schemes using the multiplexers 404 are described below with reference to FIG. 4-2.

FIG. 4-1 illustrates the example architecture of FIG. 4 for a memory portion 306 with an overlay of an example memory partitioning scheme 420. Thus, the architecture of FIG. 4-1 is at least similar to that of FIG. 4. The example memory partitioning scheme 420 is described with reference to the memory sharing examples depicted in FIG. 2-1, which span five different times and involve 25% step sizes. The arrow 212 represents elapsed time with five different events at points t=1 to 5. As indicated by the legend in the lower-right corner, each thick dashed line represents an example allocation line 422. The allocation line 422 indicates which part (e.g., which one or more banks) of the memory portion 306 (of FIG. 4) are allocated to the computational circuitry 206 of the processing component 116 and which ones are allocated to the multi-component cache controller 114. As depicted in FIG. 4-1, the banks "above" a given allocation line 422 are allocated to the computational circuitry 206, and the banks "below" the given allocation line 422 are allocated to the multi-component cache controller 114.

In this example, and as shown in FIG. 2-1, the computational circuitry 206 is allocated a first memory partition 108-1, and the multi-component cache controller 114 is allocated a second memory partition 108-2. At time t=1, the first memory partition 108-1 is empty, and the second memory partition 108-2 includes all the banks. Thus, a first allocation line 422-1 at time t=1 is depicted above the 64 memory banks. At time t=2, the first memory partition 108-1 has 25% of the banks, and the second memory partition 108-2 includes the other 75% of the banks. Thus, a second allocation line 422-2 at time t=2 is depicted below a "top row" of 16 banks and above the other 48 banks. At time t=3, both the first memory partition 108-1 and the second memory partition 108-2 include 50% of the banks. Thus, a third allocation line 422-3 at time t=3 is depicted between the top 32 banks and the bottom 32 banks.

At time t=4, the first memory partition 108-1 has 75% of the banks, and the second memory partition 108-2 includes the other 25% of the banks. Thus, a fourth allocation line 422-4 at time t=4 is depicted below three rows of 16 banks apiece, or 48 banks, and above the remaining 16 banks. In other words, the computational circuitry 206 has access to the 48 banks of the first memory partition 108-1, and the multi-component cache controller 114 can use the 16 banks of the second memory partition 108-2 for cache storage. At time t=5, the first memory partition 108-1 includes all banks of the illustrated memory portion 306, and the second memory partition 108-2 is empty. Thus, a fifth allocation line 422-5 at time t=5 is depicted below the 64 memory banks.

In this example, the banks are binned into memory partitions with a granularity of 16-bank chunks. However, other granularities can be used, such as one-bank chunks, two-bank chunks, seven-bank chunks, eight-bank chunks, 32-bank chunks, and so forth. The partitioning can be created and enforced at the hardware level using control inputs of each multiplexer 404. In other words, the control inputs can determine which bank can currently be accessed for reading or writing based on a combination of current memory partition allocation and source of a memory request. This is described next with reference to FIG. 4-2.

FIG. 4-2 illustrates an example approach 440 for controlling the multiple banks 402 and multiple multiplexers 404 of the architecture of FIG. 4 to selectively separate the memory portion 306 into multiple memory partitions 208 (e.g., of FIGS. 3, 3-2, and 4-1). Multiple banks 402-1 ... 402-4 are coupled to terminals of a multiplexer 404. Here, the multiplexer 404 is implemented as a 4×1 bidirectional multiplexer. However, the multiplexer 404 can be implemented differently, such as with multiple unidirectional multiplexers (e.g., separate ones for reading and writing data), a bidirectional 8×1 multiplexer for coupling to eight banks, two 2×1 multiplexers, combinations thereof, and so forth. Each multiplexer 404 includes at least one control input 450. FIG. 4-2 also includes one or more registers 442, one or more bank select signals 444, at least one memory allocation setting 446, at least one memory access request 448, and the logic circuitry 202.

In example implementations, as indicated with regard to the fourth bank 402-4, each bank 402 can include multiple registers 442-1 and 442-2. Each register 442 corresponds to a client of the memory 106. For example, a first register 442-1 can correspond to a processing component 116, and a second register 442-2 can correspond to a multi-component cache controller 114. Access for a given client to each bank 402 can be provided through a register 442 corresponding to the given client. Thus, to enable pipelined access per client, each client can write into a separate register 442.

The logic circuitry 202 controls access to the multiple banks 402 to enforce a current memory partitioning. Thus, the logic circuitry 202 can arbitrate access to the multiple banks 402 of the memory 106 (e.g., of FIG. 3-2). This enables the computational circuitry 206 of the processing component 116 (both of FIG. 2) or the multi-component cache controller 114 (including both) to lock a respective portion of the memory 106 for exclusive use. The memory locking can be enforced by the logic circuitry 202 using, for instance, at least one multiplexer 404 or one or more bank select signals 444. To do so, the logic circuitry 202 generates one or more bank select signals 444 to enable access to at least one bank 402 that is coupled to the multiplexer 404. The logic circuitry 202 can generate the one or more bank select signals 444 responsive to an allocation instruction provided by the computational circuitry 206 that establishes at least one memory allocation setting 446. The logic circuitry 202 provides the one or more bank select signals 444 to the multiplexer 404 via the one or more control inputs 450. For example, if a client is assigned to a memory partition that includes the third and fourth banks 402-3 and 402-4, but excludes the first and second banks 402-1 and 402-2, the logic circuitry 202 drives the control inputs 450 to permit communication with the third and fourth banks 402-3 and 402-4 and to block communication with the first and second banks 402-1 and 402-2.

To generate the bank select signals 444, the logic circuitry 202 analyzes the memory allocation setting 446 and the memory access request 448. The memory access request 448 can be for a read/retrieve data operation or a write/store data operation. The memory allocation setting 446 indicates which client is allocated which one or more memory partitions of the memory. The memory allocation setting 446 can be realized using, for example, a RAM Partition Table (RPT), a Ram Way Vector (RWV), a Partion ID (PID), some combination thereof, and so forth. The memory allocation setting 446 can additionally or alternatively be implemented using at least one register, using one or more address ranges, using a hashing function, and the like. A quantity of bank select signals 444 and corresponding control inputs 450 can depend on a number of banks coupled to terminals of the multiplexer 404, a partitioning granularity, combinations thereof, and so forth.

In example operations, the logic circuitry 202 compares the memory access request 448 to the memory allocation setting 446. The memory access request 448 can include or be associated with a memory address or a requesting client, including with both. If the requesting client or memory address comports with (e.g., matches) the memory allocation setting 446, the logic circuitry 202 generates the bank select signals 444 to enable access to the targeted bank 402 via the multiplexer 404. If a match is not determined, the logic circuitry 202 blocks access to prevent one client from accessing the data of another client. For example, the logic circuitry 202 can inspect the most significant bits (MSBs) of a memory address (e.g., 2 bits) to arbitrate between 4 "super banks" each having 16 of 64 total banks.

Thus, access to the first memory partition 108-1 (e.g., of FIG. 3-2) by the computational circuitry 206 and access to the second memory partition 108-2 by the multi-component cache controller 114 is controllable using at least one control input 450 of at least one multiplexer 404. This approach reduces the amount of hardware employed to realize memory sharing. In these manners, the logic circuitry 202 can arbitrate, using the multiplexer 404, access to the multiple banks 402-1 ... 402-4 responsive to memory access requests 448 from the computational circuitry 206 and other memory access requests 448 from the multi-component cache controller 114.

Figure 5:
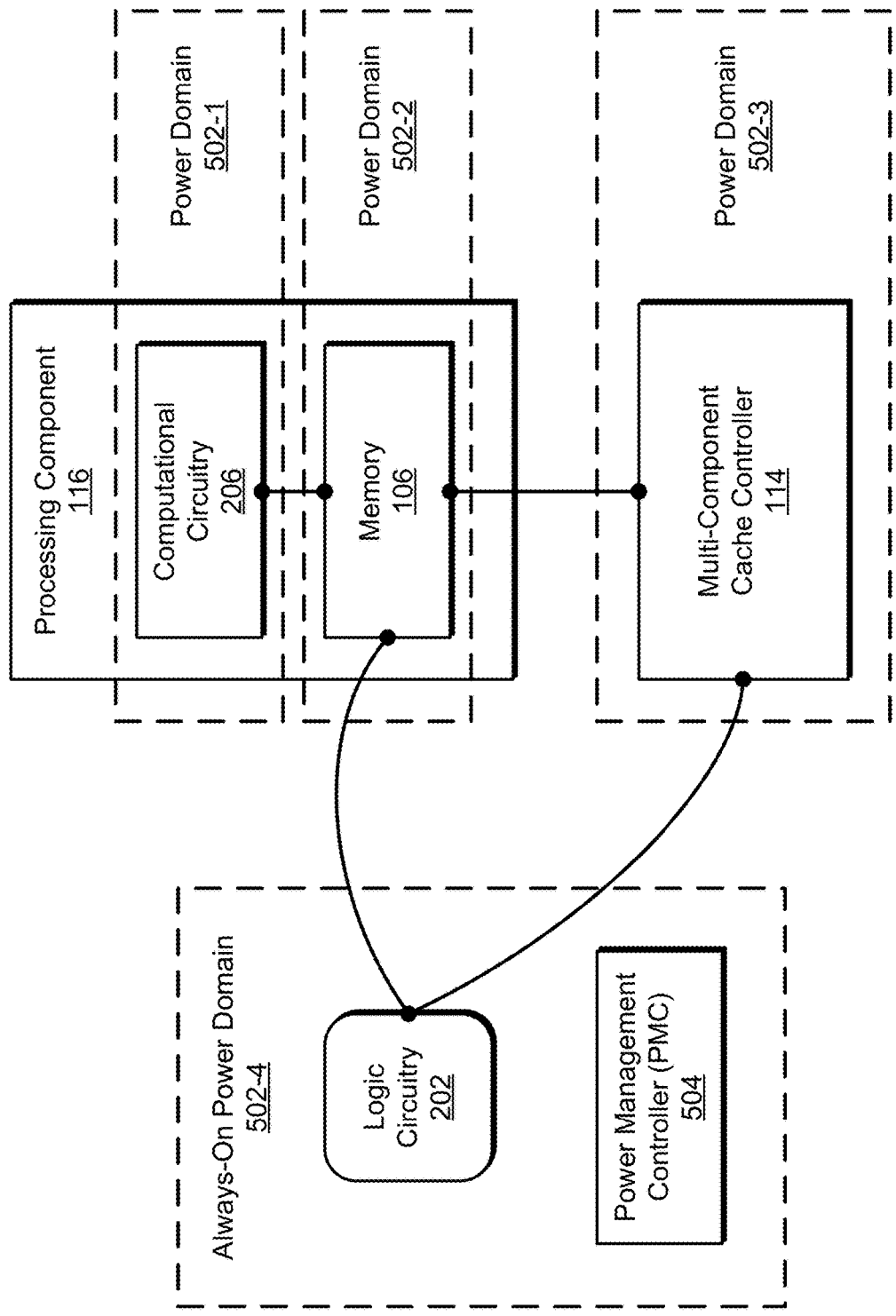
FIG. 5 is a block diagram illustrating an example power domain architecture for a memory that is shared between a processing component and a multi-component cache controller.

FIG. 5 is a block diagram illustrating an example power domain architecture 500 for a memory 106 that is shared between a processing component 116 and a multi-component cache controller 114. As illustrated, the power domain architecture 500 includes at least four power domains 502: a first power domain 502-1, a second power domain 502-2, a third power domain 502-3, and an always-on power domain 502-4. However, the power domain architecture 500 can include more or fewer power domains 502. For example, a bit array of the memory 106 can be part of a separate power domain from that of the address and data multiplexing logic thereof to enable the former to be in a retention mode while the latter experiences a power collapse.

In some implementations, each power domain 502 can be separately or independently placed in different power states, such as collapsed, sleep, on/awake, retention, standby, and so forth. The first power domain 502-1 includes the computational circuitry 206 of the processing component 116. The second power domain 502-2 includes the memory 106 of the processing component 116. With this arrangement, the first power domain 502-1 can be collapsed while the second power domain 502-2 remains powered. In this manner, the computational circuitry 206 can be provided a reduced (including zero) power level if not being used, but the memory 106 can still be utilized by the multi-component cache controller 114 to provide cache services to one or more other components.

In other implementations, the third power domain 502-3 includes the multi-component cache controller 114. The always-on power domain 502-4 includes at least a portion of the logic circuitry 202. The third power domain 502-3 can be collapsed while the second power domain 502-2 remains powered. In this manner, the multi-component cache controller 114 can cease being powered while the computational circuitry 206 can still use the powered memory 106 for storage, such as a scratchpad memory. The always-on power domain 502-4 can also include a power management controller 504 (PMC 504), which can control power states of the various power domains 502. Here, the always-on power domain 502-4 is always-on while any of the first, second, or third power domains 502-1, 502-2, or 502-3 are on or may be quickly awakened. The always-on power domain 502-4 may, however, be turned off in other circumstances, such as if a larger portion of a chip is being powered down—e.g., for the chip to enter a low-power stand-by state.

Figure 6:
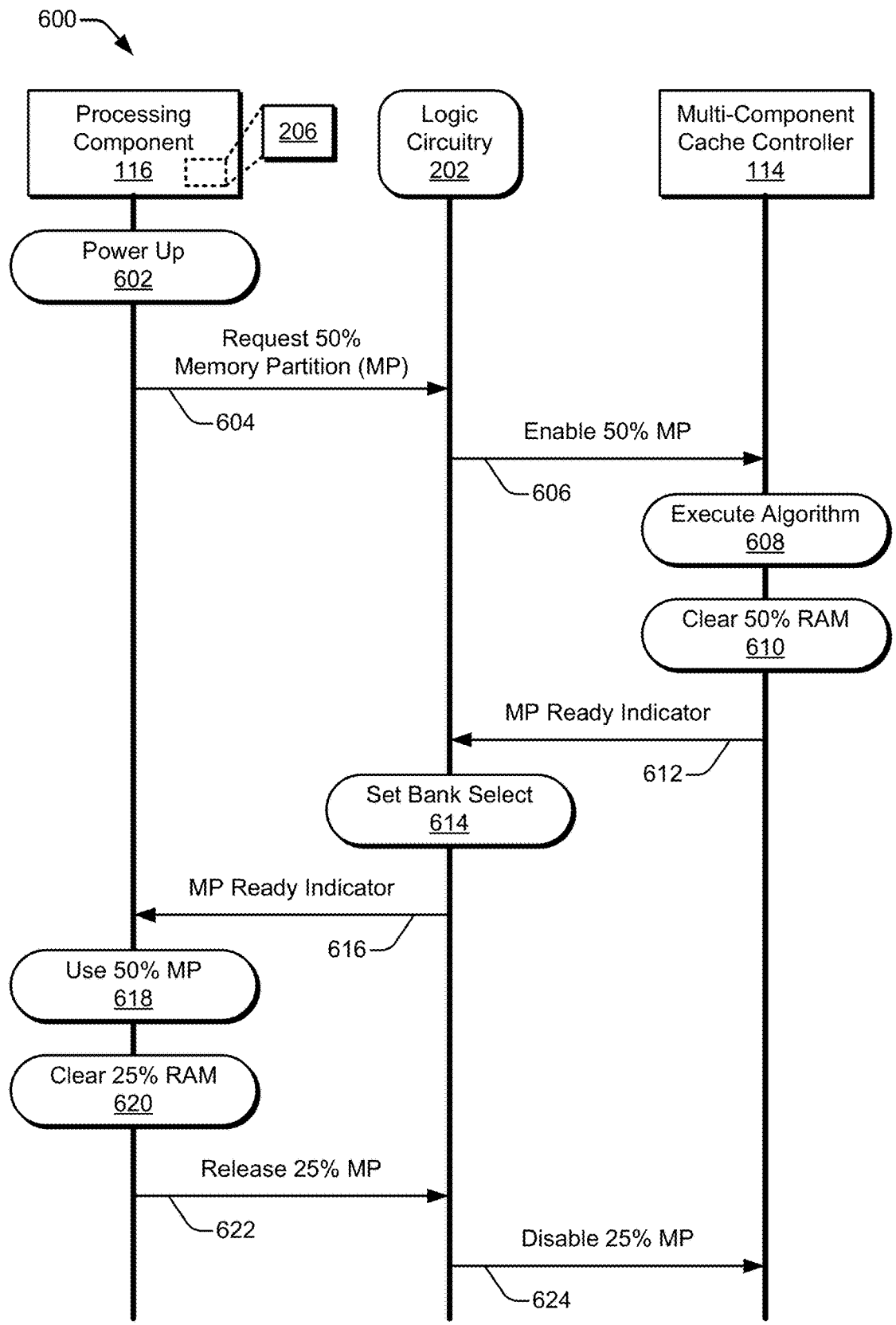
FIG. 6 is a sequence diagram illustrating an example procedure involving a processing component, a multi-component cache controller, and logic circuitry for adjusting a memory partition capacity with memory sharing.

FIG. 6 is a sequence diagram illustrating an example procedure 600 involving a processing component 116, a multi-component cache controller 114, and logic circuitry 202. The procedure 600 adjusts a memory partition capacity as part of memory sharing. The procedure 600 may also involve one or more of the multiple components 110-1 . . . 110-N (e.g., of FIG. 2). The processing component 116 can include or host computational circuitry 206 and at least one memory 106 (e.g., also of FIG. 2). The procedure 600 includes multiple operations and messages. At the onset of the example procedure 600, the computational circuitry 206 of the processing component 116 is asleep or in another low power state, and the multi-component cache controller 114 is allocated 100% of the memory 106.

At operation 602, the computational circuitry 206 of the processing component 116 is commanded to power up to perform some task, such as automatic speech recognition (ASR). In this case, the computational circuitry 206 determines that one-half of the memory 106 is to be used to perform the ASR. Thus, the processing component 116 sends to the logic circuitry 202 a request 604 for a memory partition 108 that contains 50% of the banks 402 of the memory 106. Responsive to the request 604, the logic circuitry 202 sends an enablement instruction 606 to the multi-component cache controller 114 instructing the "owner" of the memory 106 to allocate half of the memory capacity to the processing component 116.

At operation 608, the multi-component cache controller 114 executes a partition allocation algorithm to adjust the memory partitioning between at least the processing component 116 and the multi-component cache controller 114. Before transferring allocation of the requested banks, the multi-component cache controller 114 clears 50% of the RAM to prepare the banks at operation 610. To clear the banks, the multi-component cache controller 114 flushes data from the memory 106 to a main memory, like the system memory 120, in accordance with a cache management protocol. After the cached data is flushed, the multi-component cache controller 114 can also program the banks being reallocated to a predetermined value to prepare them for relinquishment for use by the processing component 116. For example, the multi-component cache controller 114 can store zeros in each memory location to clean the memory and protect the privacy of the data that was cached therein and the security of the corresponding cache client.

After clearing 50% of the RAM at the operation 610, the multi-component cache controller 114 sends to the logic circuitry 202 an indicator 612 that the requested memory partition is ready. At operation 614, the logic circuitry 202 establishes one or more bank select signals to reconfigure access rights to the memory 106. For example, the logic circuitry 202 can establish at least one memory allocation setting 446 that enables the processing component 116 to access the 50% of the memory 106 that is now allocated thereto. The logic circuitry 202 sends to the processing component 116 an indicator 616 that the requested memory partition is ready for use.

At operation 618, after the computational circuitry 206 is awake, the computational circuitry 206 uses the 50% of the memory 106 that forms the memory partition that is allocated to the processing component 116. The allocated memory partition can be used, for instance, to support the ASR processing. In this example, after some amount of time elapses, the processing component 116 determines that it can execute ongoing tasks with 25% of the memory 106. Accordingly, at operation 620, the processing component 116 clears 25% of the RAM. To do so, the processing component 116 may transfer any data that is to be retained to main memory and may program the 25% of the RAM that is being relinquished to a predetermined value. The processing component 116 sends to the logic circuitry 202 a message 622 indicating release of the banks 402 corresponding to the 25% of the RAM. In response to the message 622, the logic circuitry 202 sends to the multi-component cache controller 114 a message 624 to disable the allocation to the processing component 116 of the indicated 25% of the memory 106.

Based on the message 622, the banks of the 25% of the memory 106 are released for further allocation, for instance back to the multi-component cache controller 114 for providing cache services. Alternatively, the 25% of the RAM may be allocated to another component 110 (e.g., of FIG. 2). The procedure 600 may also be implemented in alternative manners. Messages may be transmitted, and operations may be performed in different orders, including overlapping ones. For example, the logic circuitry 202 may detect that the processing component 116 is being awakened and cause an initial or default memory allocation to be initiated during the wake up procedure for the processing component 116 so as to overlap operations and expedite processing. Other (e.g., more, fewer, or different) messages and operations may also be transmitted or performed. For instance, the multi-component cache controller 114 may communicate with a client component and instruct the client component to handle the RAM clearance (at operation 610) to enable the partition to be released by flushing its own cached data from the memory 106.

Having generally described schemes, techniques, and hardware for memory sharing, this discussion now turns to example methods.

Example Methods for Memory Sharing

Example methods are described below with reference to the flow diagram of FIG. 7. Aspects of these methods may be implemented in, for example, hardware (e.g., fixed logic circuitry or a processor in conjunction with a memory), firmware, software, or some combination thereof. The processes may be realized using one or more of the apparatuses or components shown in FIGS. 1 to 6 and 8, which components may be further divided, combined, and so on. The devices and components of these figures generally represent hardware, such as electronic devices, PCBs, packaged modules, IC chips, or circuits; firmware; software; or a combination thereof. Thus, these figures illustrate some of the many possible systems or apparatuses capable of implementing the described methods.

For these flow diagrams, the orders in which operations are shown and/or described are not intended to be construed as a limitation. Any number or combination of the described method operations can be combined in any order to implement a given method, or an alternative method. Operations may also be omitted or added to the described methods. Further, described operations can be implemented in fully or partially overlapping manners.

Figure 7:
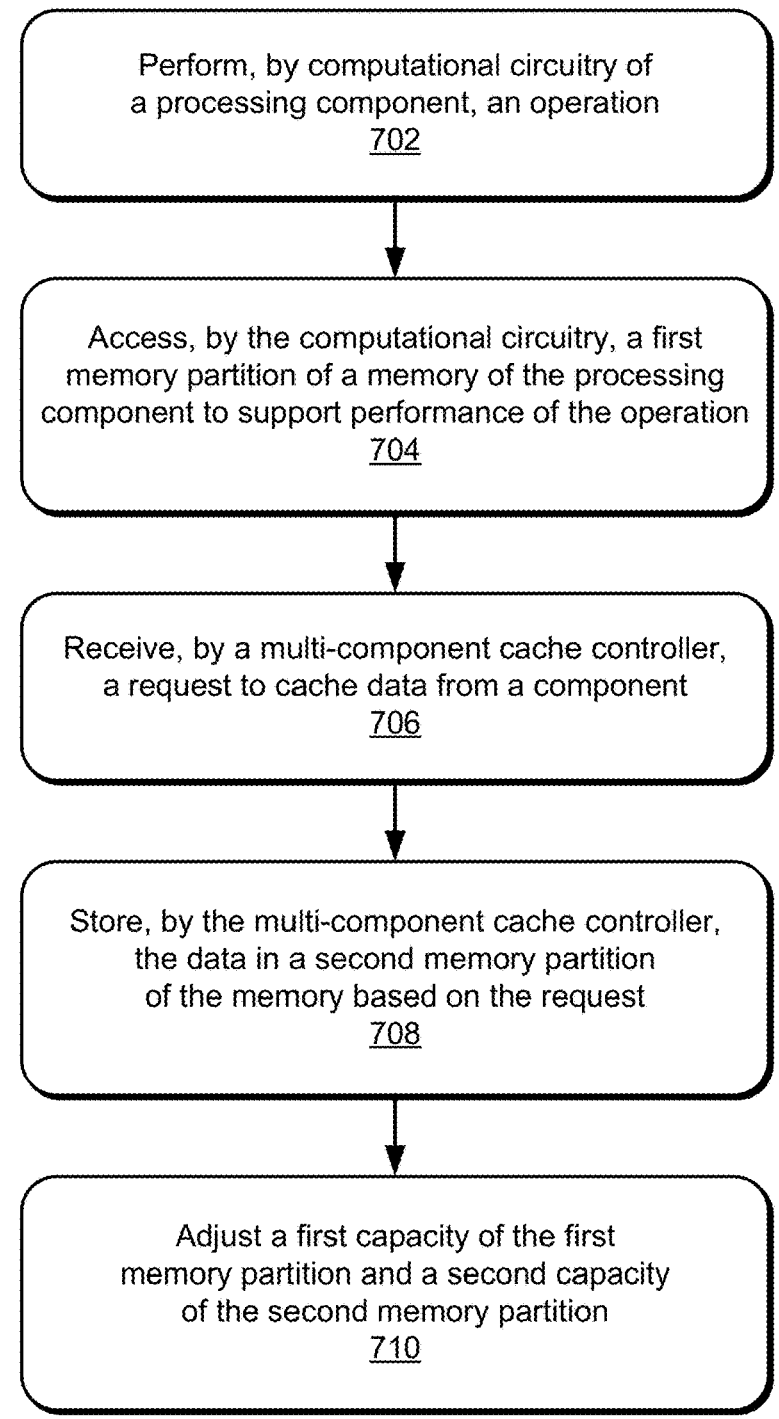
FIG. 7 illustrates example methods for an apparatus to implement memory sharing.

FIG. 7 illustrates, with a flow diagram 700, example methods for an apparatus to implement memory sharing.

The flow diagram 700 includes five blocks 702-710. At block 702, an operation is performed by computational circuitry of a processing component. For example, computational circuitry 206 of a processing component 116 can perform an operation. The operation can be any type of processing operation, depending on the capabilities of the processing component 116. For instance, the computational circuitry 206 can implement an ML model to process an image from a video.

At block 704, a first memory partition of a memory of the processing component is accessed by the computational circuitry to support performance of the operation. For example, the computational circuitry 206 can access a first memory partition 108-1 of a memory 106 of the processing component 116 to support performance of the operation (e.g., by reading from and/or writing to the first memory partition 108-1). In some cases, the computational circuitry 206 may implement the ML model, which is at least partially located in the first memory partition 108-1, by storing weights and biases in the banks 402 corresponding to the first memory partition 108-1 while computing a graph of the ML model. The stored data may be written across multiple memory portions 306 over which the first memory partition 108-1 is distributed.

At block 706, a request to cache data from a component is received by a multi-component cache controller. For example, a multi-component cache controller 114 can receive a request to cache data from a component 110. For instance, a processing core of a CPU may send data that overflows a dedicated cache thereof to the multi-component cache controller 114 for caching at a system-level cache (SLC).

At block 708, data is stored, by the multi-component cache controller, in a second memory partition of the memory based on the request. For example, the multi-component cache controller 114 can store the data in a second memory partition 108-2 of the memory 106 based on the request from the component. Thus, the multi-component cache controller 114 can load the cacheable data into a way corresponding to the second memory partition 108-2 of the memory 106. The multi-component cache controller 114 can also program associated cache tags with the appropriate address bits of the cached data.

At block 710, a first capacity of the first memory partition and a second capacity of the second memory partition are adjusted. For example, logic circuitry 202 can adjust a first capacity of the first memory partition 108-1 and a second capacity of the second memory partition 108-2. To do so, the logic circuitry 202 may facilitate cooperation between the multi-component cache controller 114 and the processing component 116 such that as one component relinquishes one or more banks of the memory 106 and therefore has a lower capacity memory partition, the other component can gain the one or more banks to therefore have a higher capacity memory partition.

Example Electronic Device

Figure 8:
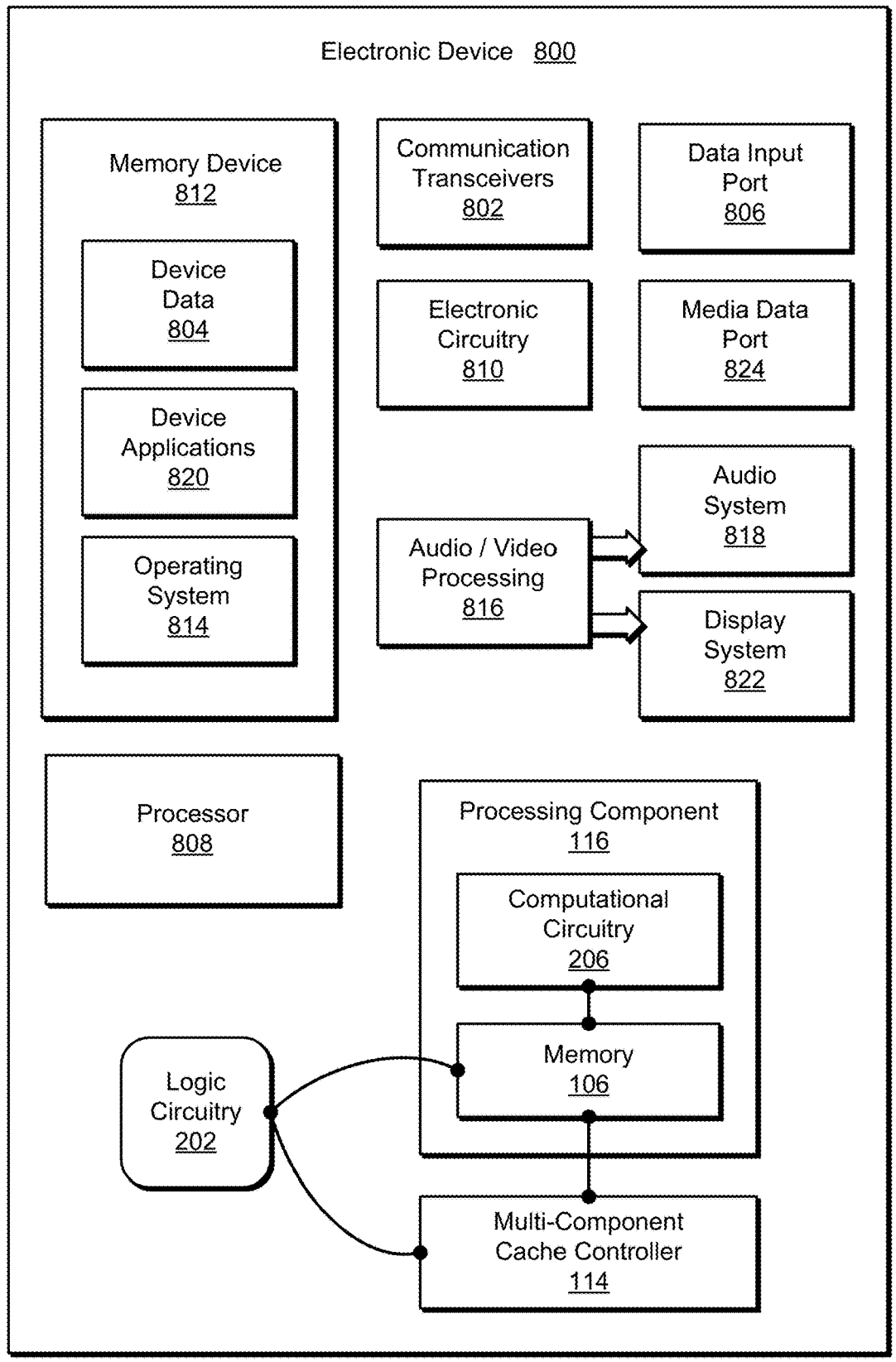
FIG. 8 illustrates various components of an example electronic device that can implement memory sharing in accordance with one or more described aspects.

FIG. 8 illustrates various components of an example electronic device 800 that can implement memory sharing in accordance with one or more described aspects. The electronic device 800 may be implemented as any one or combination of a fixed, mobile, stand-alone, or embedded device; in any form of a consumer, computer, portable, user, server, communication, phone, navigation, gaming, audio, camera, messaging, media playback, and/or other type of electronic device 800, such as the smartphone that is depicted in FIG. 1 as the apparatus 102. One or more of the illustrated components may be realized as discrete components or as integrated components on at least one integrated circuit of the electronic device 800.

The electronic device 800 can include one or more communication transceivers 802 that enable wired and/or wireless communication of device data 804, such as received data, transmitted data, or other information identified above. Example communication transceivers 802 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX) standards, infrared (IR) transceivers compliant with an Infrared Data Association (IrDA) protocol, and wired local area network (LAN) (WLAN) Ethernet transceivers.

The electronic device 800 may also include one or more data input ports 806 via which any type of data, media content, and/or other inputs can be received, such as user-selectable inputs, messages, applications, music, television content, recorded video content, and any other type of audio, video, and/or image data received from any content and/or data source, including a sensor like a microphone or camera. The data input ports 806 may include USB ports, coaxial cable ports, fiber optic ports for optical fiber interconnects or cabling, and other serial or parallel connectors (including internal connectors) for flash memory, DVDs, CDs, and the like. These data input ports 806 may be used to couple the electronic device to components, peripherals, or accessories such as keyboards, microphones, cameras, or other sensors.

The electronic device 800 of this example includes at least one processor 808 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 808 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 800 can be implemented with any one or combination of electronic circuitry, which may include software, hardware, firmware, or fixed logic circuitry that is implemented in connection with processing and control circuits, which are generally indicated at 810 (as electronic circuitry 810). This electronic circuitry 810 can implement executable or hardware-based modules (not shown in FIG. 8), such as through processing/computer-executable instructions stored on computer-readable media, through logic circuitry and/or hardware (e.g., such as an FPGA), and so forth.

Although not shown, the electronic device 800 can include a system bus, interconnect, crossbar, data transfer system, or other switch fabric that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 800 also includes one or more memory devices 812 that enable data storage, examples of which include random access memory (RAM), non-volatile memory (e.g., read-only memory (ROM), flash memory, EPROM, and EEPROM), and a disk storage device. Thus, the memory device(s) 812 can be distributed across different logical storage levels of a system as well as at different physical components. The memory device(s) 812 provide data storage mechanisms to store the device data 804, other types of code and/or data, and various device applications 820 (e.g., software applications or programs). For example, an operating system 814 can be maintained as software instructions within the memory device 812 and executed by the processor 808.

In some implementations, the electronic device 800 also includes an audio and/or video processing system 816 that processes audio data and/or passes through the audio and video data to an audio system 818 and/or to a display system 822 (e.g., a video buffer or a screen of a smartphone or camera). The audio system 818 and/or the display system 822 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, video bus, or other similar communication link, such as a media data port 824. In some implementations, the audio system 818 and/or the display system 822 are external or separate components of the electronic device 800. Alternatively, the display system 822, for example, can be an integrated component of the example electronic device 800, such as part of an integrated touch interface.

The electronic device 800 of FIG. 8 is an example implementation of the apparatus 102 of FIG. 1. Thus, the electronic device 800 can include logic circuitry 202, a multi-component cache controller 114, a processing component 116, computational circuitry 206, or a memory 106. Further, one or more of the illustrated components may be integrated on a same IC chip, like an SoC, or at least a single PCB. As shown, the processor 808 can be an example of a component 110 (e.g., of FIG. 2) or a processing component 116. The logic circuitry 202 or the multi-component cache controller 114 may be implemented as part of the electronic circuitry 840. The memory 106, as well as the other memories depicted in FIG. 2, may be part of the memory device 812. The principles of memory sharing as described herein can therefore be implemented by, or in conjunction with, the electronic device 800 of FIG. 8.

ADDITIONAL EXAMPLES

In the following, some examples are described.

Example 1: An integrated circuit comprising: multiple components; a processing component including: computational circuitry; and a memory coupled to the computational circuitry; a multi-component cache controller coupled to the memory; and logic circuitry coupled to the multi-component cache controller and the memory, the logic circuitry configured to selectively separate the memory into multiple memory partitions, the multiple memory partitions including: a first memory partition allocated to the computational circuitry and configured to provide storage to the computational circuitry; and a second memory partition allocated to the multi-component cache controller and configured to provide storage to the multiple components.

Example 2: The integrated circuit of example 1, wherein the logic circuitry is configured, responsive to one or more requests from the processing component, to selectively separate the memory into the multiple memory partitions such that: half of the memory is separated into the first memory partition and half of the memory is separated into the second memory partition at a first time; more than half of the memory is separated into the first memory partition and less than half of the memory is separated into the second memory partition at a second time; and less than half of the memory is separated into the first memory partition and more than half of the memory is separated into the second memory partition at a third time.

Example 3: The integrated circuit of example 1 or example 2, wherein: the memory comprises static random-access memory (SRAM) that is divided into multiple banks; the multi-component cache controller includes multiple cache tags that are associated with each bank of the multiple banks; each bank of the multiple banks that is part of the second memory partition corresponds to a way of multiple ways for a cache associated with the multi-component cache controller; and the logic circuitry is configured to activate or deactivate a portion of the multiple cache tags based on a capacity of the second memory partition being increased or decreased, respectively.

Example 4: The integrated circuit of any of the preceding examples, wherein: the processing component comprises a first processing component, the computational circuitry comprises first computational circuitry, and the memory comprises a first memory; the multiple components comprise a second processing component including: second computational circuitry; and a second memory coupled to the second computational circuitry; and the logic circuitry is coupled to the second memory, the logic circuitry configured to selectively separate the second memory into additional memory partitions, the additional memory partitions including: a first additional memory partition allocated to the second computational circuitry and configured to provide storage to the second computational circuitry; and a second additional memory partition allocated to the multi-component cache controller and configured to provide additional storage to at least some of the multiple components.

Example 5: The integrated circuit of example 4, wherein the multi-component cache controller is configured to provide cache services to at least some of the multiple components using the second memory partition of the first memory and the second additional memory partition of the second memory.

Example 6: The integrated circuit of any of the preceding examples, wherein: the multiple components comprise a memory block; the multi-component cache controller is coupled to the memory block; and the multi-component cache controller is configured to provide cache services to at least some of the multiple components using the second memory partition of the memory and at least a portion of the memory block.

Example 7: The integrated circuit of any of the preceding examples, further comprising: a first power domain that includes the computational circuitry of the processing component; and a second power domain that includes the memory of the processing component, wherein the first power domain can be collapsed while the second power domain remains powered.

Example 8: The integrated circuit of example 7, further comprising: an always-on power domain that includes a power management controller and at least a portion of the logic circuitry; and a third power domain that includes the multi-component cache controller, wherein the third power domain can be collapsed while the second power domain remains powered.

Example 9: The integrated circuit of any of the preceding examples, wherein the processing component is configured to program the first memory partition to a predetermined value before relinquishing the first memory partition for use by the multi-component cache controller.

Example 10: The integrated circuit of example 9, wherein the multi-component cache controller is configured to program the second memory partition to another predetermined value before relinquishing the second memory partition for use by the processing component.

Example 11: The integrated circuit of any of the preceding examples, wherein: the computational circuitry of the processing component includes multiple computation units; and the memory of the processing component includes multiple memory portions, each respective memory portion of the multiple memory portions coupled to a respective computation unit of the multiple computation units.

Example 12: The integrated circuit of example 11, wherein: the first memory partition is distributed across the multiple memory portions; and the second memory partition is distributed across the multiple memory portions.

Example 13: The integrated circuit of example 11 or example 12, wherein: the multiple memory portions comprise "M" memory portions; the multi-component cache controller includes channel logic having multiple channels comprising "L" channels; and the integrated circuit further comprises a crossbar switch to couple the channel logic to the memory, the crossbar switch configured to provide "MxL" switching between the multiple memory portions of the memory and the multiple channels of the channel logic.

Example 14: The integrated circuit of any of the preceding examples, wherein the memory includes: multiple banks configured to store data; and at least one multiplexer coupled to at least a portion of the multiple banks, the at least one multiplexer including at least one control input, wherein access to the first memory partition by the computational circuitry and access to the second memory partition by the multi-component cache controller is controllable using the at least one control input of the at least one multiplexer.

Example 15: The integrated circuit of any of the preceding examples, wherein: the memory includes: multiple banks distributed between the first memory partition and the second memory partition based on the first memory partition being allocated to the computational circuitry and the second memory partition being allocated to the multi-component cache controller; and multiple multiplexers coupled the multiple banks, the multiple multiplexers configured to control access to the multiple banks; and the logic circuitry is configured to arbitrate, using the multiple multiplexers, access to the multiple banks responsive to memory access requests from the computational circuitry and other memory access requests from the multi-component cache controller.

Example 16: A method for sharing a memory, the method comprising: performing, by computational circuitry of a processing component, an operation; accessing, by the computational circuitry, a first memory partition of a memory of the processing component to support performance of the operation; receiving, by a multi-component cache controller, a request to cache data from a component; storing, by the multi-component cache controller, the data in a second memory partition of the memory based on the request; and adjusting a first capacity of the first memory partition and a second capacity of the second memory partition.

Example 17: The method of example 16, further comprising: determining to power up the computational circuitry to perform the operation; and responsive to the determining, awakening the computational circuitry for the operation; during at least a portion of the awakening, flushing cached data out of one or more banks corresponding to the first memory partition; and relinquishing, by the multi-component cache controller, the one or more banks corresponding to the first memory partition after the cached data is flushed.

Example 18: The method of example 17, further comprising: programming, by the multi-component cache controller, the one or more banks corresponding to the first memory partition to have a predetermined value prior to the relinquishing.

Example 19: The method of any of examples 16 to 18, wherein the adjusting comprises: decreasing the first capacity of the first memory partition by deallocating, from the processing component, multiple banks of the memory; increasing the second capacity of the second memory partition by allocating, to the multi-component cache controller, the multiple banks of the memory; and activating multiple cache tags for the multiple banks of the memory such that each respective bank of the multiple banks comprises a respective way of multiple ways for a cache that uses the second memory partition to store cacheable data.

Example 20: The method of any of examples 16 to 19, further comprising: generating one or more bank select signals responsive to a memory access request provided by the computational circuitry or the multi-component cache controller; and coupling the one or more bank select signals to at least one multiplexer to enable access to one or more banks of multiple banks of the memory.

Example 21: A computer program product comprising instructions which, when executed by one or more processors, cause the one or more processors to perform the method of any of examples 16 to 20.

Example 22: The integrated circuit of any of examples 1 to 15, wherein the logic circuitry is configured to arbitrate access to the memory to: provide exclusive access to the first memory partition by the computational circuitry of the processing component; and provide exclusive access to the second memory partition by the multi-component cache controller.

Example 23: A mobile electronic device comprising the integrated circuit of any of examples 1 to 15 or 22.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for memory sharing have been described in language specific to certain features and/or methods, the subject of the appended claims is not necessarily limited to the specific features or methods described. Rather, the specific features and methods are disclosed as example implementations for memory sharing.

What is claimed is:

1. An apparatus comprising an integrated circuit, the integrated circuit comprising:
multiple components comprising one or more components and a processing component, the processing component including:
computational circuitry including multiple computation units; and
a memory including multiple memory portions, each respective memory portion of the multiple memory portions coupled to and corresponding to a respective computation unit of the multiple computation units such that each respective computation unit is configured to store data using the corresponding respective memory portion;
a multi-component cache controller coupled to the memory, the multi-component cache controller including multiple cache tags; and
logic circuitry coupled to the multi-component cache controller and the memory, the logic circuitry configured to selectively separate the memory into multiple memory partitions, the multiple memory partitions including:
a first memory partition distributed across the multiple memory portions and allocated to the computational circuitry, the first memory partition configured to provide storage to the computational circuitry; and
a second memory partition distributed across the multiple memory portions and allocated to the multi-component cache controller, the second memory partition configured to provide storage to the one or more components, the second memory partition including memory from a memory portion of the multiple memory portions that corresponds to a computation unit of the multiple computation units that is awake, the multi-component cache controller configured to use the multiple cache tags to enable the one or more components to access the second memory partition.

2. The apparatus of claim 1, wherein the logic circuitry is configured, responsive to one or more requests from the processing component, to selectively separate the memory into the multiple memory partitions such that:
half of the memory is separated into the first memory partition and half of the memory is separated into the second memory partition at a first time;
more than half of the memory is separated into the first memory partition and less than half of the memory is separated into the second memory partition at a second time; and
less than half of the memory is separated into the first memory partition and more than half of the memory is separated into the second memory partition at a third time.

3. The apparatus of claim 1, wherein:
the memory comprises static random-access memory (SRAM) that is divided into multiple banks;
the multiple cache tags of the multi-component cache controller are associated with each bank of the multiple banks;

each bank of the multiple banks that is part of the second memory partition corresponds to a way of multiple ways for a cache associated with the multi-component cache controller; and
the logic circuitry is configured to:
activate a portion of the multiple cache tags to support accessing of the cache by the one or more components based on a capacity of the second memory partition being increased; and
deactivate a portion of the multiple cache tags based on a capacity of the second memory partition being decreased.

4. The apparatus of claim 1, wherein:
the processing component comprises a first processing component, the computational circuitry comprises first computational circuitry, and the memory comprises a first memory;
the multiple components comprise a second processing component including:
second computational circuitry; and
a second memory coupled to the second computational circuitry; and
the logic circuitry is coupled to the second memory, the logic circuitry configured to selectively separate the second memory into additional memory partitions, the additional memory partitions including:
a first additional memory partition allocated to the second computational circuitry and configured to provide storage to the second computational circuitry; and
a second additional memory partition allocated to the multi-component cache controller and configured to provide additional storage to at least some of the one or more components.

5. The apparatus of claim 4, wherein the multi-component cache controller is configured to provide cache services to at least some of the one or more components using the second memory partition of the first memory and the second additional memory partition of the second memory.

6. The apparatus of claim 1, wherein:
the multiple components comprise a memory block;
the multi-component cache controller is coupled to the memory block; and
the multi-component cache controller is configured to provide cache services to at least some of the one or more components using the second memory partition of the memory and at least a portion of the memory block.

7. The apparatus of claim 1, wherein the integrated circuit further comprises:
a first power domain that includes the computational circuitry of the processing component; and
a second power domain that includes the memory of the processing component,
wherein the first power domain can be collapsed while the second power domain remains powered.

8. The apparatus of claim 7, wherein the integrated circuit further comprises:
an always-on power domain that includes a power management controller and at least a portion of the logic circuitry; and
a third power domain that includes the multi-component cache controller,
wherein the third power domain can be collapsed while the second power domain remains powered.

9. The apparatus of claim 1, wherein:
the processing component is configured to program the first memory partition to a predetermined value before relinquishing the first memory partition for use by the multi-component cache controller; and the multi-component cache controller is configured to program the second memory partition to a predetermined value before relinquishing the second memory partition for use by the processing component.

10. The apparatus of claim 1, wherein:
each respective computation unit is configured to store data using the corresponding respective memory portion without using other memory portions of the multiple memory portions.

11. The apparatus of claim 1, wherein:
the computational circuitry comprises at least a portion of an artificial intelligence (AI) accelerator; and
each respective computation unit is configured to use the corresponding respective memory portion as a scratchpad memory while executing a machine learning (ML) model.

12. The apparatus of claim 1, wherein:
the multiple memory portions comprise "M" memory portions;
the multi-component cache controller includes channel logic having multiple channels comprising "L" channels;
the integrated circuit further comprises a crossbar switch to couple the channel logic to the memory, the crossbar switch configured to provide "MxL" switching between the multiple memory portions of the memory and the multiple channels of the channel logic; and
the apparatus comprises a mobile electronic device.

13. The apparatus of claim 1, wherein the memory includes:
multiple banks configured to store data; and
at least one multiplexer coupled to at least a portion of the multiple banks, the at least one multiplexer including at least one control input,
wherein access to the first memory partition by the computational circuitry and access to the second memory partition by the multi-component cache controller is controllable using the at least one control input of the at least one multiplexer.

14. The apparatus of claim 1, wherein:
the memory includes:
multiple banks distributed between the first memory partition and the second memory partition based on the first memory partition being allocated to the computational circuitry and the second memory partition being allocated to the multi-component cache controller; and
multiple multiplexers coupled to the multiple banks, the multiple multiplexers configured to control access to the multiple banks; and
the logic circuitry is configured to arbitrate, using the multiple multiplexers, access to the multiple banks responsive to memory access requests from the computational circuitry and other memory access requests from the multi-component cache controller.

15. The apparatus of claim 14, wherein the logic circuitry is configured to arbitrate access to the memory to:
provide exclusive access by the computational circuitry to the first memory partition; and
provide exclusive access by the multi-component cache controller to the second memory partition.

16. A method for sharing a memory, the method comprising:
performing, by multiple computation units of computational circuitry of a processing component, at least one operation;
accessing, by the computational circuitry, a first memory partition of a memory of the processing component to support performance of the at least one operation, the first memory partition distributed across multiple memory portions of the memory, the accessing including:
accessing, by a respective computation unit of the multiple computation units, a respective memory portion of the multiple memory portions;
receiving, by a multi-component cache controller, a request to cache data from a component;
storing, by the multi-component cache controller, the data in a second memory partition of the memory based on the request, the second memory partition distributed across the multiple memory portions of the memory;
using, by the multi-component cache controller, multiple cache tags to enable the component to access the data stored in the second memory partition of the memory the second memory partition including memory from a memory portion of the multiple memory portions that corresponds to a computation unit of the multiple computation units that is awake; and
adjusting a first capacity of the first memory partition and a second capacity of the second memory partition.

17. The method of claim 16, further comprising:
determining to wake up the computational circuitry to perform the at least one operation; and
responsive to the determining, and prior to the accessing, awakening the computational circuitry for the at least one operation;
during at least a portion of the awakening, flushing cached data out of one or more banks that correspond to the second memory partition prior to the flushing; and
relinquishing, by the multi-component cache controller, the one or more banks after the cached data is flushed, the one or more banks corresponding to the first memory partition after the cached data is flushed.

18. The method of claim 16, wherein the adjusting comprises:
decreasing the first capacity of the first memory partition by deallocating, from the processing component, multiple banks of the memory;
increasing the second capacity of the second memory partition by allocating, to the multi-component cache controller, the multiple banks of the memory while the computation unit is awake; and
activating multiple cache tags for the multiple banks of the memory such that each respective bank of the multiple banks comprises a respective way of multiple ways for a cache that uses the second memory partition to store cacheable data.

19. The method of claim 16, further comprising:
generating one or more bank select signals responsive to a memory access request provided by the computational circuitry or the multi-component cache controller; and
coupling the one or more bank select signals to at least one multiplexer to enable access to one or more banks of multiple banks of the memory.

20. A system for memory sharing, the system comprising:
an integrated circuit comprising:
- means for performing, by multiple computation units of computational circuitry of a processing component, at least one operation;
- means for accessing, by the computational circuitry, a first memory partition of a memory of the processing component to support performance of the at least one operation, the first memory partition distributed across multiple memory portions of the memory, the means for accessing including:
  - means for accessing, by a respective computation unit of the multiple computation units, a respective memory portion of the multiple memory portions;
- means for receiving, by a multi-component cache controller, a request to cache data from a component;
- means for storing, by the multi-component cache controller, the data in a second memory partition of the memory based on the request, the second memory partition distributed across the multiple memory portions of the memory;
- means for using, by the multi-component cache controller, multiple cache tags to enable the component to access the data stored in the second memory partition of the memory, the second memory partition including memory from a memory portion of the multiple memory portions that corresponds to a computation unit of the multiple computation units that is awake; and
- means for adjusting a first capacity of the first memory partition and a second capacity of the second memory partition.

* * * * *

UNITED STATES PATENT AND TRADEMARK OFFICE
CERTIFICATE OF CORRECTION

PATENT NO. : 12,013,780 B2  
APPLICATION NO. : 17/425918  
DATED : June 18, 2024  
INVENTOR(S) : Suyog Gupta et al.

Page 1 of 1

It is certified that error appears in the above-identified patent and that said Letters Patent is hereby corrected as shown below:

In the Claims

Column 34, Line 24, Claim 16: after "of", delete "the memory" add --the memory,--

Signed and Sealed this
Twenty-seventh Day of August, 2024

Katherine Kelly Vidal
*Director of the United States Patent and Trademark Office*